(12) United States Patent
Yabe et al.

(10) Patent No.: US 7,671,582 B2
(45) Date of Patent: Mar. 2, 2010

(54) MAGNETIC ENCODER AND ROLLER BEARING UNIT HAVING MAGNETIC ENCODER

(75) Inventors: Toshikazu Yabe, Fujisawa (JP); Takeshi Murakami, Fujisawa (JP); Nariaki Aihara, Fujisawa (JP)

(73) Assignee: NSK Ltd., Tokyo (JP)

( * ) Notice: Subject to any disclaimer, the term of this patent is extended or adjusted under 35 U.S.C. 154(b) by 42 days.

(21) Appl. No.: 11/914,166

(22) PCT Filed: May 9, 2006

(86) PCT No.: PCT/JP2006/309338

§ 371 (c)(1),
(2), (4) Date: Nov. 12, 2007

(87) PCT Pub. No.: WO02/097536

PCT Pub. Date: Dec. 5, 2002

(65) Prior Publication Data

US 2008/0199118 A1    Aug. 21, 2008

(30) Foreign Application Priority Data

| May 10, 2005 | (JP) | ............................. 2005-137307 |
| May 24, 2005 | (JP) | ............................. 2005-151395 |
| May 25, 2005 | (JP) | ............................. 2005-152554 |
| Jun. 21, 2005 | (JP) | ............................. 2005-180669 |

(51) Int. Cl.
*G01P 3/42* (2006.01)
*F16C 41/00* (2006.01)

(52) U.S. Cl. ........................ 324/174; 384/448

(58) Field of Classification Search ......... 324/173–174, 324/207.25; 73/514.31, 514.39; 384/448
See application file for complete search history.

(56) References Cited

U.S. PATENT DOCUMENTS

| 4,462,919 A | * | 7/1984 | Saito et al. ................ 252/62.54 |
| 7,237,960 B2 | * | 7/2007 | Oohira et al. ................ 384/448 |
| 2003/0181631 A1 | * | 9/2003 | Takaragi et al. ............. 528/310 |

FOREIGN PATENT DOCUMENTS

| JP | 62-86803 A | | 4/1987 |
| JP | 62084502 A | * | 4/1987 |
| JP | 03060101 A | * | 3/1991 |
| JP | 4-93372 A | | 3/1992 |
| JP | 9-286050 A | | 11/1997 |
| JP | 2000-60080 A | | 2/2000 |
| JP | 2001-255337 A | | 9/2001 |
| JP | 2002-62305 A | | 2/2002 |
| JP | 2003-25363 A | | 1/2003 |
| JP | 2003282314 A | * | 10/2003 |
| WO | 2002-97536 A | | 12/2002 |

OTHER PUBLICATIONS

English Translation of the Abstract of JP 62084502 A, Apr. 1987.*
English Translation of the Abstract of JP 2003282314 A, Oct. 2003.*
English Translation of the Abstract of JP 03060101 A, Mar. 1991.*

* cited by examiner

*Primary Examiner*—Bot L LeDynh
(74) *Attorney, Agent, or Firm*—Sughrue Mion, PLLC

(57) ABSTRACT

The magnetic encoder is constituted by integrally bonding a magnet portion obtainable by forming a magnetic material containing a magnetic powder and a binder for the magnetic powder in a circular ring shape to a slinger. The binder contains at least a thermoplastic resin and an impact resistance-improving agent.

20 Claims, 13 Drawing Sheets

MAGNETIC ENCODER AND ROLLER BEARING UNIT HAVING MAGNETIC ENCODER

TECHNICAL FIELD

The present invention relates to a magnetic encoder to be used for detecting a rotational number of a rotating member and a roller bearing unit having the magnetic encoder.

BACKGROUND ART

Hitherto, as a rotational number-detecting apparatus used for anti-skid for preventing skidding of an automobile or used for a traction control for effectively transmitting a drive force to a road face, there has been frequently used an apparatus constituted by a magnetic encoder for generating a pulse by magnetism and a detection sensor for detecting the magnetic pulse of the magnetic encoder. As the rotational number-detecting apparatus, a seal fitted with the rotational number-detecting apparatus is commonly used. The apparatus is constituted by arranging the magnetic encoder along with a hermetically sealing apparatus for hermetically sealing a bearing to thereby integrate a hermetically sealing means and a rotational number-detecting means (see, for example, Patent Document 1).

One example of the seal fitted with the rotational number-detecting apparatus is shown in FIG. 13, which is constituted by a seal member 202 attached to an outer ring 201a, a slinger 203 fitted to an inner ring 201b, a magnetic encoder 204 attached to an outer side face of the slinger 303 for generating a magnetic pulse, and a sensor 205 arranged proximately to the magnetic encoder 204 for detecting the magnetic pulse. According to a bearing unit attached with the sealed rotational number-detecting apparatus, a foreign matter of dust, water or the like is prevented from invading inside of the bearing by the seal member 202 and the slinger 203, and a lubricant filled at inside of the bearing is prevented from leaking to outside of the bearing. Furthermore, the magnetic encoder 204 generates the magnetic pulses in a number corresponding to the number of the poles during a time period in which the inner ring 201b is rotated once, and detects a rotational number of the inner ring 201b by detecting the magnetic pulses by the sensor 205.

Moreover, in the magnetic encoder 204, a magnet portion formed of an elastic magnetic material obtained by mixing a magnetic powder with an elastic material such as rubber or a resin is bonded to a flange portion 203a of the slinger 203, to which an adhering agent is applied in a die, by press molding. As the elastic magnetic material, ferrite-containing nitrile rubber is generally used, and the magnetic powder is in a mechanically oriented state, which is achieved by kneading the powder with a roll.

Patent Document 1: Japanese Patent Unexamined Publication JP-A-2001-255337

DISCLOSURE OF THE INVENTION

Problems that the Invention is to Solve

Recently, in order to detect a rotational number of a wheel more accurately, there is a tendency of increasing the number of poles of a magnetic encoder 204 (multipole formation) in a circumferential direction. However, according to the magnetic encoder 204 having the ferrite-containing rubber magnet by the conventional mechanical orientation method, a magnetic flux density per pole becomes too small. Therefore, in order to accurately detect the rotational number, it is necessary to reduce a gap (i.e., air gap) between the sensor 205 and the magnetic encoder 204. Moreover, since the magnetic encoder 204 is used at underbody of an automobile as performance of the automobile advances, it is supposed that the magnetic encoder may be exposed to a high temperature environment of about 120° C. and a low temperature environment of about −40° C. and muddy water, snow melting agents, oils and fats such as grease may be attached to the surface thereof.

As a countermeasure to the problem, in order to increase the air gap, it is necessary to improve a magnetic property of the magnet portion. However, since a rare earth magnetic powder, which is common as a magnetic material having a high magnetic property, is expensive and also exhibits a low oxidation resistance as compared with the ferritic magnetic powder, there is a fear that the rare earth magnetic powder is oxidized and deteriorated when used in the above environments to result in a large decrease in magnetic property. Furthermore, a larger amount of a magnetic powder can be incorporated as compared with the case of the rubber magnet by the use of a plastic magnet consisting of a ferritic magnetic powder and a plastic to thereby achieve improvement of the magnetic property, however, in that case, the magnet portion becomes brittle and elongation and bending properties are decreased. Therefore, when the magnet portion is repeatedly exposed to high temperature environment/low temperature environment supposed when an automobile or the like, deformation of the magnet portion cannot follow deformation (size change) of the slinger 203 and, in the worst case, there is a risk of generation of a crack or the like at the magnet portion starting from a weak point of the magnet portion. In addition, when it is exposed to high temperature, oxidative degradation of the resin material constituting a binder of the magnet portion proceeds to result in further decrease in elongation and bending properties of the magnet portion. As a result, when the magnet portion is repeatedly exposed to high temperature environment/low temperature environment, a crack at the magnet portion is further apt to be brought about.

The present invention has been carried out in order to solve the above-described problem and it is an object to provide a highly reliable magnetic encoder exhibiting no production of a crack at the magnet portion even used under a severe condition, such as rapid change in temperature, having a high magnetic property, and capable of highly accurately detecting a rotational number, as well as a high-performance and highly reliable roller bearing unit having the magnetic encoder.

Means for Solving the Problems

In order to achieve the above object, the present inventors have focused on a plastic magnet material capable of containing a large amount of magnetic powder and excellent in magnetic property. As a result of the extensive studies on binder materials for the purpose of improving elasticity, the inventors have found that use of a binder containing a thermoplastic resin and an impact resistance-improving agent is effective and thus accomplished the invention.

Namely, the invention provides the following magnetic encoder and roller bearing unit.

(1) A magnetic encoder constituted by integrally bonding a magnet portion obtainable by forming a magnetic material containing a magnetic powder and a binder for the magnetic powder in a circular ring shape to a slinger, wherein the binder contains at least a thermoplastic resin and an impact resistance-improving agent.

(2) The magnetic encoder according to the (1), wherein the thermoplastic resin is a polyamide resin and the impact resistance-improving agent is at least one of vulcanized rubber particles and a modified polyamide resin.

(3) The magnetic encoder according to the (1), wherein the thermoplastic resin is a polyester-based resin and the impact resistance-improving agent is at least one of vulcanized rubber particles and a modified polyester resin.

(4) The magnetic encoder according to the (1), wherein the thermoplastic resin is a polyphenylene sulfide resin and the impact resistance-improving agent is vulcanized rubber particles.

(5) The magnetic encoder according to the (2), wherein the thermoplastic resin is a low water-absorbing polyamide resin.

(6) The magnetic encoder according to the (1), wherein the thermoplastic resin is a polyamide resin and the binder further contains an aromatic amine-based antioxidant.

(7) A roller bearing unit having a fixed ring, a rotating ring, a plurality of rolling elements rotatably arranged in a circumferential direction between the fixed ring and the rotating ring, and the magnetic encoder according to any one of the (1) to (6), wherein the magnet portion is fixed to the slinger composed of a magnetic material with an adhering agent and the slinger is fixed to the rotating ring.

ADVANTAGE OF THE INVENTION

According to the magnetic encoder of the invention, the magnet portion contains a large amount of magnetic powder and thus is excellent in magnetic property as well as contains a thermoplastic resin, which shows excellent fatigue resistance and heat resistance, and an impact resistance-improving agent. Therefore, owing to increased bending amount, a good elastic property is maintained even when the magnet portion is exposed to high temperature or low temperature and furthermore even when it is repeatedly exposed to high temperature and low temperature. As a result, accuracy for detecting rotation is high and reliability is also high. In addition, the roller bearing unit having the magnetic encoder also exhibits a high performance and a high reliability.

DESCRIPTION OF REFERENCE NUMERALS AND SIGNS

Figure 1:
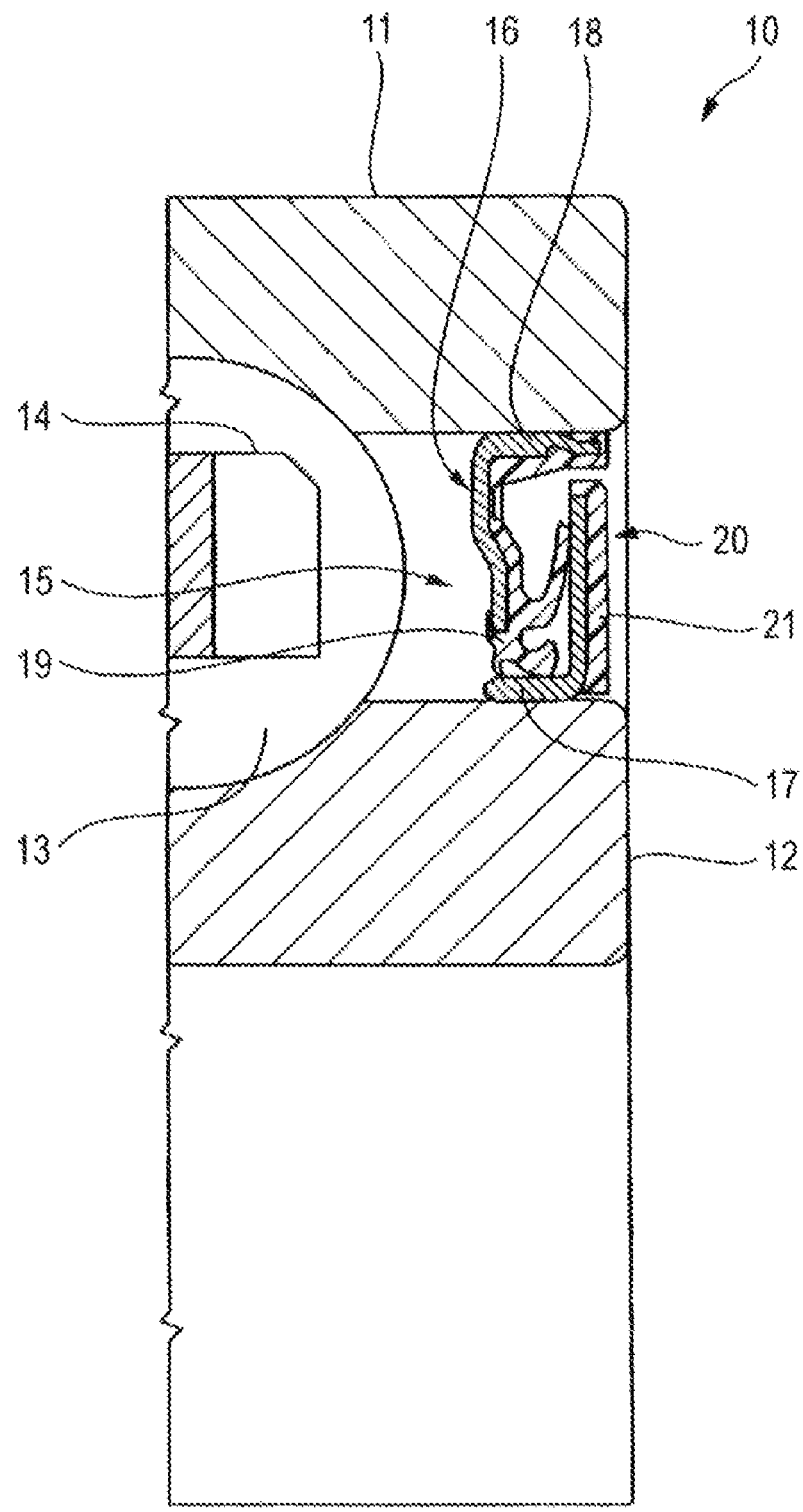
FIG. 1 is a sectional view showing one example of a roller bearing unit having a magnetic encoder.

10 roller bearing unit
11 outer ring
12 inner ring
13 ball
14 retainer
15 hermetically sealing apparatus
16 seal member
17 slinger
17*d* recessed and protruded portion

Best Mode for Carrying out the Invention

The following will explain the present invention in detail with reference to the drawings.

The magnetic encoder of the invention has a magnet portion formed by circularly arranging a magnetic material having a magnetic powder and a specific binder to be mentioned below.

As a material of the slinger, a magnetic material such as ferritic stainless (SUS430 or the like) or martensitic stainless steel (SUS410 or the like) which does not deteriorate the magnetic property of the magnet material and has a corrosion resistance equal to or higher than a constant level in view of the usage environment is the most preferable. In this connection, when a bearing unit having a sensor cap (refer to the third Embodiment), corrosion resistance is not so required and hence a cold-rolled steel sheet (SPCC) or the like may be used in view of costs.

On the other hand, as the magnetic powder constituting the magnetic material, in consideration of magnetic property and weatherproof, a ferritic magnetic powder such as strontium ferrite or barium ferrite or a rare earth magnetic powder of samarium-iron-nitrogen, samarium-cobalt, or neodymium-iron-boron can be preferably used. These magnetic powders can be used solely or in combination of themthem. In this connection, when a main working environment is a high temperature environment (e.g., about 150° C.), a rare earth magnetic powder is used when a high magnetic property (BHmax of more than 2.0 MGOe) is required and a formulation containing a ferritic magnetic powder as a main component is preferable in view of costs when a low magnetic property (BHmax of 1.6 to 2.0 MGOe) is sufficient. Moreover, a content of the magnetic powder in the magnetic material depends on the kind of the magnetic powder but there arises no practical problem when the content falls within the range of 70 to 92 wt %. However, since the magnet portion is molded at a temperature equal to or higher than the thermoplastic resin of binder, reduction of magnetism is expected when using samarium-iron-nitrogen, so that a higher content thereof is preferable.

Moreover, with regard to the magnetic powder, in order to improve dispersion and improve interaction with the binder, a silane coupling agent having an organic functional group such as an amino group or an epoxy group is preferably incorporated into the magnetic material.

The binder is a material that an impact resistance-improving agent is added to at least a thermoplastic resin. As the thermoplastic resin, at least one of polyphenylene sulfide resins, polyester-based resins, and polyamide resins is employed.

With regard to the polyphenylene sulfide resin, any of linear chain resins and crosslinked branched resins may be used but linear chain resins are preferable in view of the toughness. Moreover, the polyphenylene sulfide resin is preferably a powdery product when dispersibility and homogeneity of the material at pelletization thereof under mixing with a magnetic powder in an extruder or the like.

The polyester-based resin is a resin excellent in fatigue resistance and heat resistance and has an effect of improving heat shock resistance of the magnet portion. As the polyester-based resin, polyethylene terephthalate, polybutylene terephthalate, polyethylene naphthalate, polybutylene naphthalate, poly-1,4-cyclohexanedimethylene terephthalate, and a poly-1,4-cyclohexanedimethylene terephthalate/polyethylene terephthalate copolymer are preferable. Of these, polybutylene terephthalate and polybutylene naphthalate, which are high in crystallization speed, are preferred. These polyester-based resins can be used solely or suitably in combination.

The polyamide resin is also a resin excellent in fatigue resistance and heat resistance and has an effect of improving heat shock resistance of the magnet portion. Of the polyamide resins, polyamide 6, polyamide 66, and polyamide 46 are preferable and are used solely or suitably in combination.

On the other hand, since polyamide 6 (PA6), polyamide 66 (PA66), and polyamide 46 (PA46) have a high water absorbing property (see Table 1), it is preferable to use a low water-absorbing polyamide resin as a polyamide resin or to use it in combination with polyamide 6, polyamide 66, or polyamide 46, in order to cope with a highly humid environment.

As the low water-absorbing polyamide resin, preferred is a polyamide having a water absorbing ratio (weight-increasing ratio) of 0.7 wt % or less when immersed in water at 23° C. for 24 hours. Specifically, polyamide 12 (PA12), polyamide 11 (PA11), polyamide 612 (PA612), polyamide 610 (PA610), modified polyamide 6T (PA6T), polyamide 9T (PA9T), polyamide MXD6 (PAMXD6), and the like may be mentioned.

In this connection, modified polyamide 6T is:

a polycondensation products wherein part of terephthalic acid of polyamide 6T, which is polycondensation products of hexamethylenediamine and terephthalic acid, is changed into at lest one of adipic acid and isophthalic acid (specifically, PA6T/66, PA6T/6I, PA6T/6I/66), a polycondensation product wherein part of hexamethylenediamine of polyamide 6T is changed into methylpentanediamine (PA6T/M-5T), a polycondensation product using polyamide 6T and ε-caprolactam as repeating units (PA6T/6), or the like.

In addition, polyamide MXD6 is a polycondensation product of metaxylylenediamine with adipic acid.

Table 1 shows water absorbing ratios of the above-mentioned polyamide resins (measured values under the above described conditions) and Table 2 shows melting points thereof. Of the low water-absorbing polyamide resins, modified polyamide 6T, polyamide 9T, and polyamide MXD6 are preferred since they have both of low water absorbing property and heat resistance.

TABLE 1

| Water absorbing ratio (wt %) | | | | | | | | |
|---|---|---|---|---|---|---|---|---|
| PA12 | PA11 | PAMXD6 | Modified PA6T | PA9T | PA610 | PA612 | PA66 | PA6 |
| 0.25 | 0.30 | 0.31 | 0.3 to 0.68 | 0.17 | 0.50 | 0.25 | 1.30 | 1.80 |

TABLE 2

| Melting point (° C.) | | | | | | | | |
|---|---|---|---|---|---|---|---|---|
| PA12 | PA11 | PAMXD6 | Modified PA6T | PA9T | PA610 | PA612 | PA66 | PA6 |
| 176 | 187 | 243 | 290 to 320 | 317 | 213 to 225 | 212 to 219 | 260 to 265 | 220 to 228 |

With regard to the low water-absorbing polyamide resin, a powdery product is preferable when dispersibility at pelletization in an extruder or the like after mixing with a magnetic powder, homogeneity of materials in the resulting magnet portion, and the like are considered.

The impact resistance-improving agent is an elastic material having an function of relaxing vibration and impact. In the invention, resins and rubber materials shown below can be suitably used according to the thermoplastic resin.

When the thermoplastic resin is polyphenylene sulfide resin, rubber materials are used. Of these, owing to high compatibility with the polyphenylene sulfide resin, vulcanized rubber particles composed of styrene-butadiene rubber, acrylic rubber, acrylonitrile-butadiene rubber, carboxyl-modified acrylonitrile-butadiene rubber, silicone rubber, chloroprene rubber, hydrogenated nitrile rubber, carboxyl-modified hydrogenated nitrile rubber, carboxyl-modified styrene-butadiene rubber, or ethylene-propylene nonconjugated diene rubber are preferable and they are used solely or in combination of them. Of these, preferred are particles composed of acrylic rubber or carboxyl-modified hydrogenated nitrile rubber having a functional group showing a relatively strong interaction with the polyphenylene sulfide resin, such as a carboxyl group or an ester group, in the molecule.

In order to prevent deterioration by heat and oxygen, a diphenylamine-based antiaging agent such as 4,4'-(α,α-dimethylbenzyl)diphenylamine, a secondary antiaging agent such as 2-mercaptobenzimidazole, or the like may be incorporated into these rubber particles.

These rubber particles are preferably fine particles having a mean particle diameter of 30 to 300 nm. When the mean particle diameter is less than 30 nm, in addition to its high cost, since the particle becomes too fine, it tends to be easily deteriorated, the case is not preferable. When the mean particle diameter is more than 300 nm, the case is not preferable because dispersibility decreases and it becomes difficult to perform uniform improvement of impact resistance.

Moreover, the adding amount of the impact resistance-improving agent is preferably from 5 to 30 wt %, more preferably from 10 to 20 wt % based on the total amount of the impact resistance-improving agent and the polyphenylene sulfide resin. When the adding amount is less than 5 wt %, an improving effect is small owing to too small amount thereof, so that the case is not preferable. When the adding amount is more than 30 wt %, impact resistance is improved but the amount of the polyphenylene sulfide resin becomes relatively small and thus tensile strength and the like decreases, so that practicability becomes low.

When the thermoplastic resin is a polyester resin, a modified polyester-based resin can be used as an impact resistance-improving agent. The modified polyester-based resin is a block copolymer having a hard segment of the above-mentioned polyester-based resin and a soft segment of at least one of a polyester component and a polyether component. Of these, preferred is one containing polyethylene terephthalate or polybutylene naphthalate as a hard segment. Moreover, when compatibility with the polyester-based resin to be mixed is considered, preferred is a modified polyester-based resin whose hard segment is the same as that of the polyester-based resin. Furthermore, with regard to the modified polyester-based resin, a powdery product is suitable.

As specific examples of the modified polyester-based resin, there are mentioned a polybutylene terephthalate-based modified polyester-based resin containing polybutylene terephthalate represented by the following formula (1) as a hard segment and a polyether component as a soft segment,

[Chem 1]

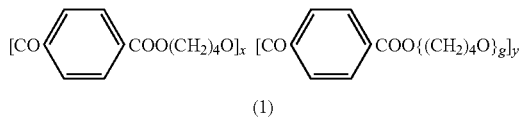

(1)

a polybutylene terephthalate-based modified polyester-based resin containing polybutylene terephthalate represented by the following formula (2) as a hard segment and a polyester component as a soft segment,

[Chem 2]

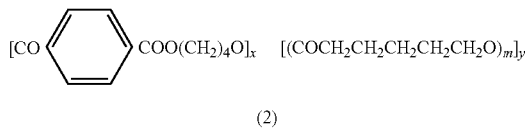

(2)

a polybutylene naphthalate-based modified polyester-based resin containing polybutylene naphthalate represented by the following formula (3) as a hard segment and a polyether component as a soft segment.

[Chem 3]

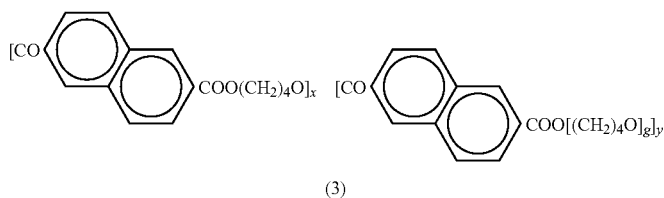

(3)

Of these specific examples, preferred are modified polyester-based resins having a hard segment represented by the formula (2) or (3), which are excellent in heat resistance. When ozone resistance, water resistance, and oil resistance are further required, preferred is a modified polyester-based resin having a hard segment represented by the formula (3).

Moreover, as a rubber material when the thermoplastic resin is a polyester resin, vulcanized rubber particles of styrene-butadiene rubber, acrylic rubber, acrylonitrile-butadiene rubber, carboxyl-modified acrylonitrile-butadiene rubber, silicone rubber, chloroprene rubber, hydrogenated nitrile rubber, carboxyl-modified hydrogenated nitrile rubber, or carboxyl-modified styrene-butadiene rubber are preferable and they are used solely or in combination of them. Of these, when deterioration is considered at pellet production and molding of the magnet portion, particles of acrylic rubber, acrylonitrile-butadiene rubber, carboxyl-modified acrylonitrile-butadiene rubber, silicone rubber, hydrogenated nitrile rubber, or carboxyl-modified hydrogenated nitrile rubber are preferable. Further, of these, preferred are particles composed of acrylic rubber, carboxyl-modified acrylonitrile-butadiene rubber, or carboxyl-modified hydrogenated nitrile rubber having a functional group showing a relatively strong interaction with the polyester-based resin, such as a carboxyl group or an ester group, in the molecule.

In order to prevent deterioration by heat and oxygen, a diphenylamine-based antiaging agent such as 4,4'-($\alpha$,$\alpha$-dimethylbenzyl)diphenylamine, a secondary antiaging agent such as 2-mercaptobenzimidazole, or the like may be incorporated into these rubber particles.

These rubber particles are preferably fine particles having a mean particle diameter of 30 to 300 nm. When the mean particle diameter is less than 30 nm, the case is not preferable because of high costs and also easy deterioration due to their too fine particles. When the mean particle diameter is more than 300 nm, the case is not preferable because dispersibility decreases and it becomes difficult to perform uniform improvement of impact resistance.

Moreover, as the impact resistance-improving agent, ethylene-propylene non-conjugate diene rubber (EPDM), maleic anhydride-modified ethylene-propylene non-conjugate diene rubber (EPDM), an ethylene/acylate copolymer, an ionomer, or the like can be also used. It is in a pellet form but is fluidized and micro-dispersed into the polyester-based resin at the time when it is kneaded with a magnetic powder, a polyester-based resin, and the like in an extruder to be pelletized at preparation of a magnetic material.

The adding amount of the impact resistance-improving agent is preferably from 5 to 50 wt %, more preferably from 10 to 40 wt % based on the total amount of the impact resistance-improving agent and the polyester-based resin. When the adding amount is less than 5 wt %, an improving effect is small owing to too small amount thereof, so that the case is not preferable. When the adding amount is more than 50 wt %, impact resistance is improved but the amount of the polyester-based resin becomes relatively small and thus tensile strength and the like decreases, so that practicability becomes low.

In order to prevent deterioration of the polyester-based resin and the impact resistance-improving agent by heat, other than those originally added to the materials, it is further suitable to incorporate an antioxidant separately. As the antioxidant, hindered phenol-based compounds such as 2,4-bis [(octylthio)methyl]-o-cresol, triethylene glycol bis[3-(3-t-butyl-5-methyl-4-hydroxyphenyl) propionate], pentaerythritol tetrakis[3-(3,5-di-t-butyl-4-hydroxyphenyl) propionate], 1,3,5-trimethyl-2,4,6-tris (3,5-di-t-butyl-4-hydroxybenzyl)benzene, and N,N'-hexamethylenebis (3,5-di-t-butyl-4-hydroxy-hydrocinnamide, hydroquinone derivatives such as 2,5-di-t-butylhydroquinone, sulfur-based compounds such as bis[2-methyl-4-{3-n-alkyl($C_{12}$ or $C_{14}$)thiopropionyloxy}-5-t-butylphenyl]sulfide, phosphite ester-based compounds, and diphenylamine-based compounds such as 4,4'-($\alpha,\alpha$-dimethylbenzyl) diphenylamine and 4,4'-dioctyldiphenylamine, p-phenylenediamine-based compounds such as N,N'-diphenyl-p-phenylenediamine, N-isopropyl-N'-phenyl-p-phenylenediamine, N,N'-di-2-naphthyl-p-phenylenediamine, N,N'-bis(1-methylheptyl)-p-phenylenediamine, N,N'-bis(1,4-dimethylpentyl)-p-phenylenediamine, and N-(1,3-dimethylbutyl)-N'-phenyl-p-phenylenediamine are suitable. Of the above compounds, diphenylamine-based compounds and p-phenylenediamine-based compounds have a large effect of oxidation resistance and are most suitable.

The adding amount of these antioxidants is preferably from 0.05 to 1.0 wt %, more preferably from 0.1 to 0.5 wt % in the total amount of the binder. When the adding amount of the antioxidant is less than 0.05 wt %, an improving effect of oxidation resistance is small, so that the case is not preferable. When the adding amount is more than 1.0 wt %, the effect of oxidation resistance is not so changed and decrease in magnetic properties and mechanical strength is invited owing to the resultant decreased amount of the magnetic powder and the binder, so that the case is not preferable.

Moreover, when the thermoplastic resin is a polyamide resin, a modified polyamide resin can be used as an impact resistance-improving agent. The modified polyamide resin is a block copolymer having a hard segment composed of a polyamide resin and a soft segment composed of at least one of a polyester component and a polyether component and, as commercially available products, modified polyamide resins containing polyamide 6, polyamide 11, or polyamide 12 as a hard segment are known. Of these, in view of compatibility, preferred is a modified polyamide whose hard segment is the same as the polyamide resin constituting the binder. Furthermore, with regard to the modified polyamide resin, a powdery product is suitable.

Further, as a rubber material applied when the polyamide resin, vulcanized rubber particles composed of styrene-butadiene rubber, acrylic rubber, acrylonitrile-butadiene rubber, carboxyl-modified acrylonitrile-butadiene rubber, silicone rubber, chloroprene rubber, hydrogenated nitrile rubber, carboxyl-modified hydrogenated nitrile rubber, or carboxyl-modified styrene-butadiene rubber are preferred and they are used solely or in combination of them. Of these, when deterioration is considered at pellet production and molding of the magnet portion, particles composed of acrylic rubber, acrylonitrile-butadiene rubber, carboxyl-modified acrylonitrile-butadiene rubber, silicone rubber, hydrogenated nitrile rubber, or carboxyl-modified hydrogenated nitrile rubber are preferable. Further, of these, preferred are particles composed of acrylic rubber, carboxyl-modified acrylonitrile-butadiene rubber, or carboxyl-modified hydrogenated nitrile rubber having a functional group showing a relatively strong interaction with the polyamide resin, such as a carboxyl group or an ester group, in the molecule.

In order to prevent deterioration by heat and oxygen, a diphenylamine-based antiaging agent such as 4,4'-($\alpha,\alpha$-dimethylbenzyl)diphenylamine, a secondary antiaging agent such as 2-mercaptobenzimidazole, or the like may be incorporated into these rubber particles.

These rubber particles are preferably fine particles having a mean particle diameter of 30 to 300 nm. When the mean particle diameter is less than 30 nm, the case is not preferred because of high costs and easy deterioration since they are too fine. When the mean particle diameter is more than 300 nm, the case is not preferred because dispersibility decreases and it becomes difficult to perform uniform improvement of impact resistance.

Moreover, as the impact resistance-improving agent, ethylene-propylene non-conjugate diene rubber (EPDM), maleic anhydride-modified ethylene-propylene non-conjugate diene rubber (EPDM), an ethylene-acylate copolymer, an ionomer, or the like can be also used. It is in a pellet form but is fluidized and micro-dispersed into the polyamide resin at the time when it is kneaded with a magnetic powder, a polyamide resin, and the like in an extruder to be pelletized at preparation of a magnetic material.

The adding amount of the impact resistance-improving agent is preferably from 5 to 60 wt %, more preferably from 5 to 50 wt %, further preferably from 10 to 40 wt % based on the total amount of the impact resistance-improving agent and the polyamide resin. When the adding amount is less than 5 wt %, an improving effect is small owing to too small amount thereof, so that the case is not preferable. When the adding amount is more than 60 wt %, impact resistance is improved but the amount of the polyamide resin becomes relatively small and tensile strength and the like decreases, so that practicability becomes low.

In order to prevent deterioration of the polyamide resin and the impact resistance-improving agent by heat, other than those originally added to the materials, it is further suitable to incorporate an antioxidant separately. As the antioxidant, hindered phenol-based compounds such as 2,4-bis[(octylthio) methyl]-o-cresol, triethylene glycol bis[3-(3-t-butyl-5-methyl-4-hydroxyphenyl)propionate], pentaerythritol tetrakis [3-(3,5-di-t-butyl-4-hydroxyphenyl)propionate], 1,3,5-trimethyl-2,4,6-tris(3,5-di-t-butyl-4-hydroxybenzyl) benzene, and N,N'-hexamethylenebis(3,5-di-t-butyl-4-hydroxy-hydrocinnamide, hydroquinone derivatives such as 2,5-di-t-butylhydroquinone, sulfur-based compounds such as bis[2-methyl-4-{(3-n-alkyl($C_{12}$ or $C_{14}$)thiopropionyloxy}-5-t-butylphenyl]sulfide, phosphite ester-based compounds, and diphenylamine-based compounds such as 4,4'-($\alpha,\alpha$-dimethylbenzyl)diphenylamine and 4,4'-dioctyldiphenylamine, p-phenylenediamine-based compounds such as N,N'-diphenyl-p-phenylenediamine, N-isopropyl-N'-phenyl-p-phenylenediamine, N,N'-di-2-naphthyl-p-phenylenediamine, N,N'-bis(1-methylheptyl)-p-phenylenediamine, N,N'-bis(1, 4-dimethylpentyl)-p-phenylenediamine, and N-(1,3-dimethylbutyl)-N'1-phenyl-p-phenylenediamine, and aromatic amine-based compounds such as naphthylamine-based compounds are suitable. Of the above compounds, diphenylamine-based compounds and p-phenylenediamine-based compounds have a large effect of oxidation resistance and are most suitable.

The adding amount of these antioxidants is preferably from 0.05 to 2.0 wt %, more preferably from 0.05 to 1.0 wt %, further preferably from 0.1 to 0.5 wt % in the total amount of the binder. When the adding amount of the antioxidant is less than 0.05 wt %, an improving effect of oxidation resistance is small, so that the case is not preferable. When the adding amount is more than 2.0 wt %, the effect of oxidation resistance is not so changed and decrease in magnetic properties and mechanical strength is invited owing to the resultant decreased amount of the magnetic powder and the binder, so that the case is not preferable.

When the thermoplastic resin is a low water-absorbing polyamide resin, a modified low water-absorbing polyamide resin can be used as an impact resistance-improving agent. The modified low water-absorbing polyamide resin is a block copolymer having a hard segment composed of the above-mentioned low water-absorbing polyamide resin and a soft segment composed of at least one of a polyester component and a polyether component and, as commercially available products, modified polyamide resins containing polyamide 11 or polyamide 12 as a hard segment are known. Moreover, in view of compatibility, preferred is a modified low water-absorbing polyamide whose hard segment is the same as the low water-absorbing polyamide resin used as the binder. In addition, a modified polyamide 12 can be used. Furthermore, with regard to the modified low water-absorbing polyamide resin, a powdery product is suitable.

Moreover, as a rubber material in the case that the thermoplastic resin is the low water-absorbing polyamide resin, vulcanized rubber particles composed of styrene-butadiene rubber, acrylic rubber, acrylonitrile-butadiene rubber, carboxyl-modified acrylonitrile-butadiene rubber, silicone rubber, chloroprene rubber, hydrogenated nitrile rubber, carboxyl-modified hydrogenated nitrile rubber, carboxyl-modified styrene-butadiene rubber, or ethylene-propylene non-conjugate diene rubber (EPDM) are preferred and they are used solely or in combination of them. Of these, when deterioration is considered at pellet production and molding of the magnet portion, particles composed of acrylic rubber, acrylonitrile-butadiene rubber, carboxyl-modified acrylonitrile-butadiene rubber, silicone rubber, hydrogenated nitrile rubber, or carboxyl-modified hydrogenated nitrile rubber are preferred. Furthermore, of these, preferred are particles composed of acrylic rubber, carboxyl-modified acrylonitrile-butadiene rubber, or carboxyl-modified hydrogenated nitrile rubber having a functional group showing a relatively strong interaction with the low water-absorbing polyamide resin, such as a carboxyl group or an ester group, in the molecule.

These rubber particles are preferably fine particles having a mean particle diameter of 30 to 300 nm. When the mean particle diameter is less than 30 nm, the case is not preferable because of high costs and easy deterioration since they are too fine. When the mean particle diameter is more than 300 nm, dispersibility decreases and it becomes difficult to perform uniform improvement of impact resistance, so that the case is not preferable.

In order to prevent deterioration by heat and oxygen, a diphenylamine-based antiaging agent such as 4,4'-($\alpha,\alpha$-dimethylbenzyl)diphenylamine, a secondary antiaging agent such as 2-mercaptobenzimidazole, or the like may be incorporated into these rubber particles.

The adding amount of the impact resistance-improving agent is preferably from 5 to 60 wt %, more preferably from 10 to 40 wt % based on the total amount of the agent and the low water-absorbing polyamide resin. When the adding amount is less than 5 wt %, an improving effect is small owing to too small amount thereof, so that the case is not preferable. When the adding amount is more than 60 wt %, impact resistance is improved but the amount of the low water-absorbing polyamide resin becomes relatively small and thus tensile strength and the like decreases, so that practicability becomes low.

In order to prevent deterioration of the low water-absorbing polyamide resin and the impact resistance-improving agent by heat, other than those originally added to the materials, an amine-based antioxidant having a high oxidation-preventing effect is incorporated. Of the amine-based antioxidant, aromatic amine-based compounds, e.g., diphenylamine-based compounds such as 4,4'-($\alpha,\alpha$-dimethylbenzyl)diphenylamine and 4,4'-dioctyldiphenylamine and p-phenylenediamine-based compounds such as N,N'-diphenyl-p-phenylenediamine, N-isopropyl-N'-phenyl-p-phenylenediamine, N,N'-di-2-naphthyl-p-phenylenediamine, N,N'-bis(1-methylheptyl)-p-phenylenediamine, N,N'-bis(1,4-dimethylpentyl)-p-phenylenediamine, and N-(1,3-dimethylbutyl)-N'-phenyl-p-phenylenediamine are suitable.

The adding amount of the amine-based antioxidant is preferably from 0.5 to 2.0 wt % based on the total amount of the binder. When the adding amount of the amine-based antioxidant is less than 0.5 wt %, an improving effect of oxidation resistance is small, so that the case is not preferable. When the adding amount is more than 2.0 wt %, the effect of oxidation resistance is not so changed and decrease in magnetic properties and mechanical strength is invited owing to the resultant decreased amount of the magnetic powder and the binder, so that the case is not preferable.

With the magnetic material containing the binder, a bending amount at 23° C. (t=3.0 mm, ASTM D790; span distance of 50 mm) falls within the range of 2 to 15 mm. Since the material is excellent in bending property, it has high crack resistance and occurrence of breakage such as crack in the magnet portion becomes difficult even when it is repeatedly exposed to high temperature and low temperature.

In production of the magnetic encoder, the magnetic material is first subjected to insert molding using the slinger to which an adhesive is baked beforehand as a core. On this occasion, it is preferable to use a disk gate-type injection molding machine. The melted magnetic material is spread in a disk-like shape and then flows into a mold corresponding to the inner diameter thick portion, whereby the magnetic powder in a scale-like shape included therein is oriented in parallel with the face. Particularly, a portion between an inner diameter portion and an outer diameter portion at a vicinity of the inner diameter thickness portion detected by the rotation sensor is provided with higher orientation and is very near to axial anisotropy oriented in a thickness direction. When a magnetic field is applied to the mold in the thickness direction in molding (magnetic field molding), the anisotropy becomes further near to complete anisotropy. On the other hand, even when magnetic field molding is carried out, when a side gate type injection molding machined is applied, in the progress of gradually increasing a viscosity of the melted magnetic material to solidification, it is difficult to completely make orientation at a weld portion anisotropic and, thereby, there is a possibility of deteriorating the magnetic property and bringing about a crack or the like at the weld portion where the mechanical strength is lowered by a long period of use, so that the case is not preferable.

As a usable adhering agent to be baked to the slinger, a phenolic resin based adhering agent, an epoxy resin based adhering agent or the like which can be diluted by solvent and in which a curing reaction is progressed approximately in two stage is preferable. These adhering agents have advantages that they are excellent in heat resistance, chemical resistance, handling performance, and the like.

The phenol resin-based adhering agent used as a vulcanizing adhering agent of rubber is preferable and, although a composition thereof is not particularly limited, novolak type phenol resin or resol-type phenol resin, and a curing agent of hexamethyltetramine or the like dissolved in methanol or methyl ethyl ketone or the like can be used. Furthermore, in order to improve adhesiveness, they may be mixed with novolak type epoxy resin.

As the epoxy resin-based adhering agent, one solution type epoxy-based adhering agent capable of being diluted to a solvent is preferable as a raw liquid. The one solution type epoxy-based adhering agent is brought into a semicured state to a degree of not flowing off by melted plastic magnet material under high temperature and high pressure in insert molding at a surface of the slinger by pertinent temperature and time after evaporating the solvent and is brought into a completely cured state by heat from melted magnetic material in insert molding and by secondary heating.

The one solution type epoxy-based adhering agent has at least an epoxy resin and a curing agent. With regard to the curing agent, a curing reaction hardly proceeds at around room temperature, but the curing agent is brought into a semicured state at, for example, about 80 to 120° C., and the heat curing reaction proceeds completely by applying heat at a high temperatures of 120 to 180° C. The adhering agent may be added with other epoxy compound used as a reactive diluting agent, a curing accelerator for increasing a heat curing speed, an inorganic filling member achieving an effect of improving heat resistance or curing strain resistance, crosslinked rubber fine particles improving flexibility of being deformed when stress is applied.

The epoxy resin having two or more epoxy groups included in the molecule is preferable in view of the fact that a crosslinked structure capable of achieving sufficient heat resistance can be formed or the like. Further, the epoxy resin having four or less, further three or less epoxy groups is preferable in view of the fact that a resin composition having a low viscosity can be provided. When the number of epoxy groups included in the molecule is excessively small, heat resistance of the cured product tends to be deteriorated and strength thereof tends to be weakened. On the other hand, when the number of epoxy groups is excessively large, the viscosity of the resin composition tends to be increased and shrinkage by curing tends to be increased.

Moreover, a number average molecular weight of the epoxy resin is preferably from 200 to 5500, particularly from 200 to 1000 in view of a balance of physical properties. When the number average molecular weight is excessively small, the strength of the cured product tends to be weakened and humidity resistance tends to be reduced. On the other hand, when the number mean molecular weight is excessively large, the viscosity of the resin composition tends to be increased and use of a reactive diluting agent for adjusting operability tends to be increased.

Furthermore, an equivalent amount of an epoxy resin is preferably 100 to 2800, more preferably, 100 to 500 in view of the fact that an amount of blending the curing agent is brought into a proper range or the like. When the epoxy equivalent is excessively small, an amount of blending the curing agent tends to be excessively large and the physical properties of the cured product tend to be deteriorated. On the other hand, when the epoxy equivalent is excessively large, the amount of blending the curing agent tends to be reduced and also the viscosity of the resin composition tends to be increased by increasing a molecular amount of the epoxy resin per se.

As the epoxy resin, for example, there are mentioned copolymers with other polymers such as bisphenol A type epoxy resin, bisphenol F type epoxy resin, bisphenol AD type epoxy resin, naphthalene type epoxy resin, biphenyl type epoxy resin, glycidylamine type epoxy resin, alicyclic epoxy resin, dicyclopentadiene type epoxy resin, phenol novolak type epoxy resin, polyester-modified epoxy resin, silicone-modified epoxy resin. Of these, bisphenol A type epoxy resin, bisphenol F type epoxy resin, bisphenol AD type epoxy resin, naphthalene type epoxy resin, phenol novolak type epoxy resin and the like are preferable since the resins are relatively low in viscosity and cured products thereof are excellent in heat resistance and humidity resistance.

As the curing agent, an amine-based curing agent, a polyamide-based curing agent, an acid anhydride-based curing agent, a latent curing agent or the like can be used.

The amine-based curing agent is an amine compound and does not form an ester bond by a curing reaction and therefore, is provided with excellent humidity resistance in comparison with the case of using the anhydride-based curing agent, so that the case is preferable. Although amine compound may be any of aliphalic mines, alicyclic amines, and aromatic amines, an aromatic amine is the most preferable since storing stability at room temperature is high and heat resistance of a cured product is high. As specific examples of the aromatic amine, there are mentioned 3,3'-diethyl-4,4'-diaminodiphenylmethane, 3,5-diethyl-2,6-toluenediamine, 3,5-diethyl-2,4-toluenediamine, a mixture of 3,5-diethyl-2,6-toluenediamine and 3,5-diethyl-2,4-toluenediamine, and the like.

The polyamide-based curing agent is also referred to as polyamideamine and is a compound having a plurality of active amino groups in the molecule and having one or more amide groups similarly. The polyamide-based curing agent synthesized from polyethylene polyamine is preferable since an imidazolidine ring is formed by secondary heating, compatibility with an epoxy resin, and mechanical properties are improved. The polyamide-based curing agent may be of an adductive type previously reacted with a small amount of an epoxy resin and, by constituting the polyamide based curing agent of the adductive type, compatibility with an epoxy resin is excellent, curing dry performance and waterproof/chemical resistance are improved, so that the case is preferable. By using the polyamide-based curing agent, tough cured resin particularly rich in flexibility is produced by being crosslinked with epoxy resin and therefore, the resin is excellent in heat shock resistance required for the magnetic encoder of the invention, so that the case is preferable.

A cured product constituted by being cured by the acid anhydride-based curing agent is excellent in heat resistance and excellent in mechanical and electrical properties at high temperatures. On the other hand, the cured product tends to be slightly fragile and can be improved by being combined with a curing accelerator of tertiary amine or the like. As the acid anhydride-based curing agent, phthalic anhydride, methyltetrahydrophthalic anhydride, end-methylenetetrahydrophthalic anhydride, methylene-end-methylenehydropthalic anhydride, methylhexahydrophthalic anhydride, trimellitic anhydride, or the like can be exemplified.

The latent curing agent is excellent in storing stability at normal temperature and is rapidly cured under a condition equal to or higher than a constant temperature in a system mixed with epoxy resin. As actual embodiments, there are a latent curing agent activated in heating with a neutral salt or a complex of an acidic or basic compound which can be a curing agent of an epoxy resin, a latent curing agent which is heated and dissolved with a substance which is crystalline, has a high melting point, and is not compatible with an epoxy resin at room temperature, and the like. As specific examples of the latent curing agent, 1,3-bis(hydrazinocarboethyl)-5-isopropylhydantoin, eicosanedioic dihydrazide, adipic dihydrazide, dicyandiamide, 7,11-octadecadiene-1,18-dicarbohydrazide or the like may be mentioned. Of these, 7,11-octadecadiene-1,18-dicarbohydrazide becomes tough cured resin particularly rich in flexibility by being crosslinked with an epoxy resin by being used as the curing agent and therefore, the resin is excellent in heat shock resistance required for the magnetic encoder of the invention, so that the case is preferable.

As the reactive diluting agent, t-butylphenyl glycidyl ether, 2-ethylhexyl glycidyl ether, allyl glycidyl ether, phenyl glicidyl ether, or the like can be used and pertinent flexibility can be provided to a cured product by adding the reactive diluting agent. However, when the reactive diluting agent is used in a large amount, humidity resistance or heat resistance of the cured product is deteriorated and therefore, the reactive diluting agent is added in a ratio of preferably 30 wt % or less, more preferably 20 wt % or less relative to the epoxy resin constituting a main substance.

As the curing accelerator, preferred is one having sufficient storage stability without acting as a curing accelerator at normal temperature and progressing the curing reaction rapidly when temperature becomes a high temperature of 100° C. or higher. For example, there is a compound having one or more ester bonds formed by reacting 1-alkoxyethanol with a carboxylic acid or the like in the molecule. The compound is a compound represented by, for example, the general formula (4):

wherein $R^2$ is an n-valent hydrocarbon group having 2 to 10 carbon atoms and containing one or more kinds of nitrogen atom, oxygen atom, and the like, $R^1$ is a monovalent hydrocarbon group having 1 to 6 carbon atoms and containing one or more kinds of nitrogen atom, oxygen atom, and the like, and n is an integer of 1 to 6. As a specific example thereof, there are mentioned a compound represented by the following formula (5);

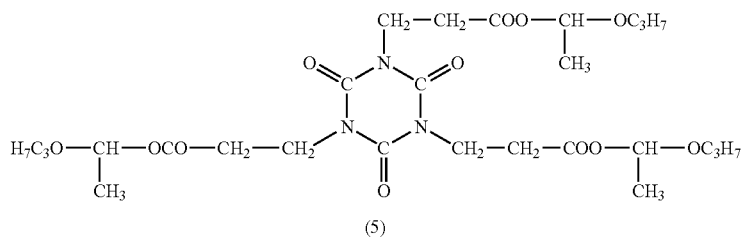

a compound in which $R^2$ is a divalent phenyl group and $R^1$ is a propyl group, a compound in which $R^2$ is a trivalent phenyl group and $R^1$ is a propyl group, a compound in which $R^2$ is a tetravalent phenyl group and $R^1$ is a propyl group, and the like. They may be used solely or in combination of two or more thereof. Of these, a compound represented by the formula (5) is most preferable in view of a balance between curing reactivity and storage stability.

In addition to the above-described compounds, imidazole compounds such as 2-methylimidazole, 2-ethyl-4-methylimidazole, 2-undecylimidazole, 2-phenylimidazole and the like may be used as curing accelerators.

Moreover, as the curing accelerator, a carboxylic acid such as adipic acid may be used as a compound which has active hydrogen and reacts with an epoxy group to cause a ring-opening reaction. When adipic acid is used, it reacts with an epoxy group of an epoxy resin and an amino group of the curing agent and the resulting cured product exhibits flexibility as an amount of adding adipic acid increases. In order to express flexibility, the amount of adding adipic acid is from 10 to 40 wt %, more preferably from 20 to 30 wt % relative to the total amount of the adhering agent. When the adding amount is less than 10 wt %, sufficient flexibility is not expressed. In contrast thereto, when the adding amount exceeds 40 wt %, a total amount of an epoxy resin in the adhering agent is reduced by the added amount, adhering force and mechanical strength are reduced, so that the case is not preferable.

Furthermore, as the curing accelerator, a tertiary amine such as dimethylbenzylamine, a quaternary ammonium salt such as tetrabutylammonium bromide, an alkyl urea such as 3-(3',4'-dichlorophenyl)-1,1-dimethylurea acting as a catalyst for accelerating a ring opening reaction of an epoxy group may be added.

The OH group formed by the ring opening reaction, including the amines or the like described in the above, forms a hydrogen bond with a hydroxyl group on the surface of a slinger, and can maintain a strongly adhered state by acting on the amide bond and the like of a low water-absorbing polyamide constituting a binder material.

As the inorganic filler, any one can be used without particular limitation so far as it is conventionally used. As specific examples thereof, melted silica powder, quartz glass powder, crystalline glass powder, glass fiber, alumina powder, talc, aluminum powder, titanium oxide or the like is mentioned.

As the crosslinked rubber fine particles, those having a functional group capable of being reacted with an epoxy group are preferable, and specifically, vulcanized acrylonitrile-butadiene rubber having a carboxyl group in a molecular chain is most preferable. A smaller particle diameter is more preferable and an ultrafine particle having a mean particle diameter of about 30 to 200 nm is most preferable for exhibiting a dispersibility and stable flexibility.

With regard to the above one solution type epoxy adhering agent, the curing reaction hardly proceeds at normal temperature, the adhering agent is brought into a semicured state at, for example, about 80 to 120° C., and a heat curing reaction is completely progressed by applying heat at a high temperature of 120 to 180° C. The adhering agent capable of being adhered by high frequency heating at around 180° C. is most preferable.

With regard to a cured product after heat curing of the phenol resin-based adhering agent or epoxy resin-based adhering agent described in the above, as physical properties, bending elastic modulus or Young's modulus falls within the range of 0.02 to 5 GPa, more preferably 0.03 through 4 GPa, or hardness (duarometer D scale; HDD) falls within the range of 40 to 90, more preferably 60 to 85. When the bending elastic modulus or Young's modulus is less than 0.02 GPa or the hardness (HDD) is less than 40, the adhering agent per se is excessively soft and is apt to be deformed by vibration induced during running an automobile or the like, and thereby, the magnet portion is easy to be moved. As a result, there is a concern of lowering accuracy of detecting the rotational number, so that the case is not preferable. On the other hand, when the bending elastic modulus or Young' modulus exceeds 5 GPa, or the hardness (HDD) exceeds 90, the adhering agent is excessively hard, it is difficult to be deformed to absorb the difference in linear expansion coefficient between the magnet portion and the slinger and, in the worst case, there is a risk of producing a crack or the like in the magnet portion, so that the case is not preferable. Heat shock resistance is required for the adhering agent of the invention when the use in an automobile is premised, and the adhering agent having flexibility in a cured state (deformed when a stress is applied) is more preferable.

Other than the phenol resin-based adhering agents and epoxy resin-based adhering agents described in the above, adhering agents for adhering the magnet portion and the slinger can be selected in consideration of the environment to be used, adhesive force, and the like. As specific examples of the other adhering agents, there are mentioned resorcinol resin-based adhering agents, polyurethane resin-based adhering agents, polyimide-based adhering agents, polyether imide-based adhering agents, polyether amide-based adhering agents, polyimide siloxane-based adhering agents, polybenzimidazole-based adhering agents, silicone-based adhering agents, cyanoacrylate-based adhering agents, acrylic resin-based adhering agents, polyester-based adhering agents, polyamide resin-based adhering agents, nitrile rubber-based adhering agents, chloroprene rubber-based adhering agents, and the like.

After the magnetic material is filled into the mold as above, demagnetization is carried out by a magnetic field in a direction reverse to a magnetizing direction in cooling in the mold. Next, after removing the gate portion, the adhering agent is completely cured and then, the material is further demagnetized to a magnetic flux density of 2 mT or less, more preferably 1 mT or less using a demagnetizer such as an oil condenser type one.

Next, the gate is cut and, in order to completely cure the adhering agent, the material is heated at a constant temperature for a constant time in a constant-temperature bath. Depending on the circumstances, heating for a short period at a high temperature by high frequency heating or the like can be also carried out.

Thereafter, the material is overlapped on a magnetizing yoke to magnetize multipole-wise (see FIG. 3) to thereby obtain the magnetic encoder. The number of the poles is from about 70 to 130 poles, preferably from 90 to 120 poles. When the number of the poles is less than 70 poles, the number of the poles is excessively small and thus it is difficult to accurately detect a rotational number. In contrast thereto, when the number of the poles exceeds 130 poles, respective pitches become excessively small, it is difficult to restrain a single pitch error to be small, and practicability is low.

In this connection, there is shown in the an embodiment where the magnetic encoder is fabricated by insert molding of the magnetic material using the slinger as a core, but the slinger and the magnet portion may be fabricated separately and bonded with an adhering agent. As the adhering agent to be used at that time, the one solution type epoxy-based adhering agent shown in the above is most suitable in consideration of heat resistance and water resistance but the adhering agent is not necessarily an adhering agent capable of being diluted with a solvent.

Furthermore, when the magnetic encoder is used in an environment of high humidity in addition to high temperature, it is preferable to form a moisture resistant film on the exposed face of the magnet portion in order to prevent deterioration of the magnetic powder by water absorption. When using a rare earth magnetic powder, it is particularly effective. In this connection, as materials for the moisture resistant film, noncrystalline fluorocarbon resin, curable urethane resin, curable acrylic resin, curable epoxy resin, polyparaxylene derivative, and the like are suitable. However, noncrystalline fluorocarbon resin and polyparaxylene derivative having water repellency in the resins per se exhibit a high effect of restraining moisture from permeating the resins, and hence are particularly preferable.

The noncrystalline fluorocarbon resin is a polymer having a fluorine-containing aliphatic ether ring structure in the main chain and is specifically obtained by cyclization polymerization of a monomer consisting of an alkenyl vinyl ether such as perfluoro(allyl vinyl ether) or perfluoro(butenyl vinyl ether) or by copolymerization of the monomer(s) with a radical polymerizable monomer such as tetrafluoroethylene, chlorotrifluoroethylene, or perfluoro (methyl vinyl ether). In order to improve adhesiveness (adhesion property) to the magnet portion, the noncrystalline fluorocarbon resin preferably has a structure where a functional group such as a carboxyl group is introduced into a terminal or the like. Moreover, the noncrystalline fluorocarbon resin dissolves in a perfluorinated solvent such as perfluoro(2-butyltetrahydrofuran), so that film formation is suitably carried out by immersion in a solution in which the noncrystalline fluorocarbon resin is dissolved in a perfluorinated solvent in an amount of about 1 to 10 wt %, followed by drying. At this occasion, the thickness of the film is dependent on the concentration of the immersion solution and the concentration is suitably adjusted so as to achieve a desired film thickness. In order to maintain a sufficient humidity resistance, the thickness of the film is preferably from 0.1 to 10 µm, more preferably from 0.3 to 2 µm. When the thickness of the film is less than 0.1 µm, it is difficult to form such a thin film stably and it becomes difficult to secure a sufficient humidity resistance. On the other hand, when the thickness of the film exceeds 10 µm, the humidity resistance does not change and also it becomes difficult to form such a thick film uniformly and the costs become high, so that the case is not preferable. In order to further improve adhesiveness to the magnet portion, it is more effective to conduct heat treatment at around 100 to 120° C. for 0.5 to 2 hours after film formation or to conduct primer treatment beforehand.

The curable urethane resin, curable acrylic resin, and curable epoxy resin have a functional group capable of being cured by heat or ultraviolet ray in the structure. The thickness of the film is about the same as when the noncrystalline fluorocarbon resin. Since the curable urethane resin, curable acrylic resin, and curable epoxy resin per se have no water repellency and are not excellent in water-shielding ability, there may be a structure where a metal deposit film intervenes between films consisting of these resins. As the kind of the metal deposit film, aluminum, chromium, nickel, and the like are suitable. The thickness of the film is preferably from 0.008 to 0.1 µm, more preferably from 0.01 to 0.05 µm. When the thickness of the film is less than 0.008 µm, it is difficult to form such a thin film stably and it becomes difficult to secure a sufficient humidity resistance. On the other hand, when the thickness of the film exceeds 0.1 μm, the humidity resistance does not change and also cost-up and weight increase are supposed, so that the case is not preferable. However, since it is difficult to obtain sufficient film strength and adhesiveness by direct formation of the metal deposition film, it is preferable to locate a curable urethane resin, a curable acrylic resin, or a curable epoxy resin therebetween as an underlying layer.

The polyparaxylylene derivative is represented by the following chemical formula (6) and is formed by chemical deposition of (2,2)-paracyclophane compound represented by the chemical formula (7).

[Chem 5]

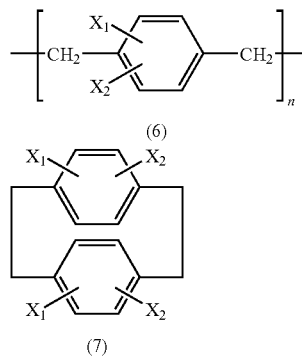

(6)

(7)

In this connection, in the chemical formulae (6) and (7), $X_1$ and $X_2$ are each a hydrogen atom, a lower alkyl, or a halogen atom, and may be the same or different from each other. Moreover, as specific examples of the polyparaxylene derivative represented by the chemical formula (6), there are mentioned polyparaxylylene, polymonochloroparaxylylene, polydichloroparaxylylene, and the like. Heat resistance is higher in the compound having more chlorine substituents. When working temperature of the magnetic encoder is supposed, more preferable are polymonochloroparaxylylene having a common-use maximum working temperature of about 120° C. and polydichloroparaxylylene having the temperature of about 150° C.

Moreover, the compound represented by the following general formula (8) wherein part of hydrogen atoms of the polyparaxylylene derivative represented by the chemical formula (6) is fluorinated has a very high common-use maximum working temperature of about 250° C., so that it is a preferable moisture-resistant film.

[Chem 6]

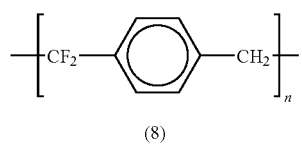

(8)

The thickness of the film composed of the polyparaxylylene derivative is preferably from 0.5 to 5 μm. When the thickness of the film is less than 0.5 μm, it becomes difficult to secure a sufficient humidity resistances and the humidity resistance does not change and the costs becomes high even when it exceeds 5 μm, so that the cases are not preferable.

The following will describe embodiments of the roller bearing unit having the magnetic encoder constituted as above.

First Embodiment

Figure 2:
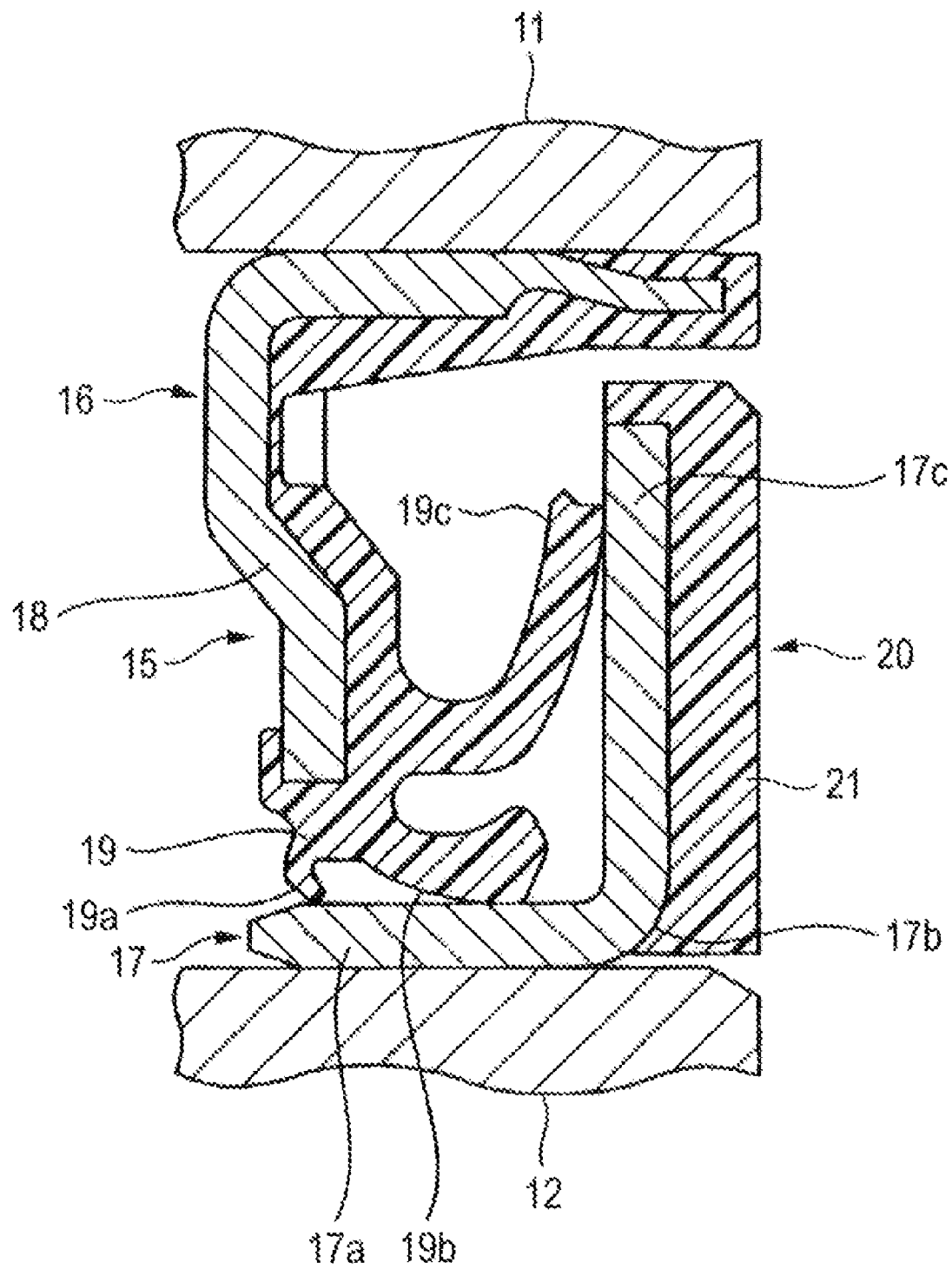
FIG. 2 is a sectional view showing a vicinity of the encoder of FIG. 1.

FIG. 1 is a sectional view showing one example of a roller bearing unit having a magnetic encoder and FIG. 2 is an enlarged view showing a vicinity of the magnetic encoder. The roller bearing 10 shown in the figure has an outer ring 11 constituting a fixed ring, an inner ring 12 constituting a rotating ring (rotating member), balls 13 constituting a plurality of rolling elements rotatably arranged between a ring-like gap partitioned by the outer ring 11 and the inner ring 12 and held with equal intervals in a circumferential direction by a retainer 14, a hermetically sealing apparatus 15 arranged at an opening end portion of the ring-like gap, and a magnetic encoder 20 for detecting rotation number of the inner ring 12.

The hermetically sealing apparatus 15 includes a sealing member 16 mounted to an inner peripheral face of the outer ring 11 and a slinger 17 arranged on an outer side of the opening end portion rather than a sealing member 16 and fixed to an outer peripheral face of the inner ring 42. The hermetically sealing apparatus 15 closes the opening end portion of the ring-like gap through sliding contact between the seal member 16 and the slinger 17, thereby a foreign matter of dust or the like being prevented from invading inside of the bearing and a lubricant filled at inside of the bearing being prevented from being leaked. In this connection, the sealing member 16 is constituted by reinforcing a rubber seal 19 formed in a circular ring shape having a section substantially in an L-like shape with a core metal 18 similarly formed in a circular ring shape having a section substantially in an L-like shape and a front end portion of the rubber seal 19 is branched to a plurality of seal lips 19a, 19b, and 19c, the seal lips being brought into sliding contact with a surface of the slinger 17.

The magnetic encoder 20 is constituted by the slinger 17 and a magnetic pole-forming ring 21 attached to the outer side face (magnet bonded face) of the slinger 17 and composed of the magnet material, and the magnetic pole-forming ring 21 is fixed to the inner ring 12 using the slinger 17 as a fixing member.

Figure 3:
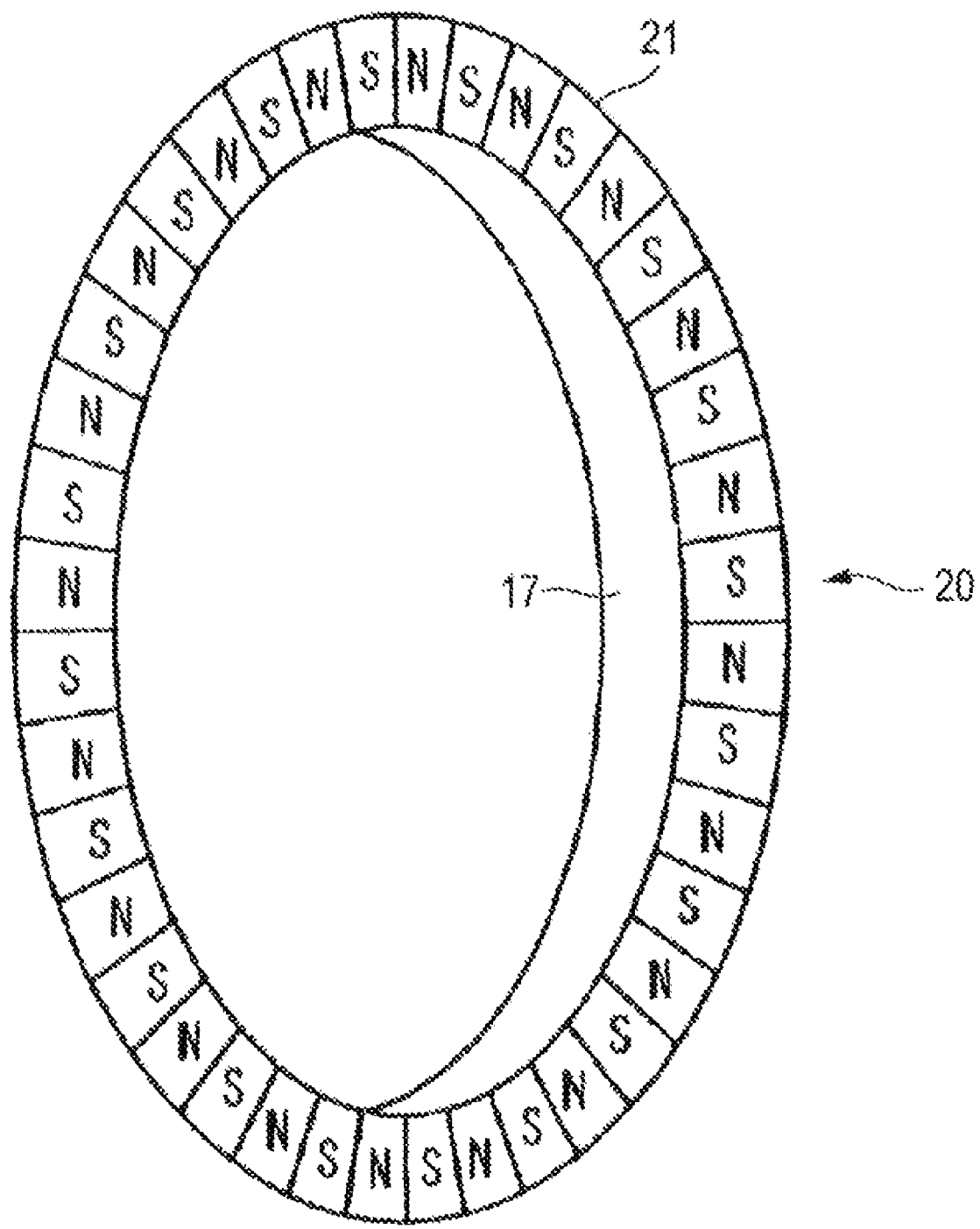
FIG. 3 is a schematic view showing an example of a magnet portion multipole-wise magnetized in a circumferential direction.

The slinger 17 is constituted by a thin plate of ferritic stainless (SUS430 etc.), martensitic stainless (SUS410 etc.), or the like and has a cylindrical portion 17a outwardly fitted to the inner ring 12 and a flange portion 17c in a flange-like shape linked to the end portion in an axial direction of the cylindrical portion 17a through the curved portion 17b and developed in a radial direction. The magnetic pole-forming ring 21 is a multipole magnet as shown in FIG. 3 and S poles and N poles are alternately formed in a circumferential direction thereof. The number of the poles in the magnetic pole-forming ring 21 is from about 70 to 130 poles, preferably from 90 to 120 poles. In addition, a magnetic sensor (not shown in the figure) is arranged oppositely to the magnetic pole-forming ring 21.

Figure 4:
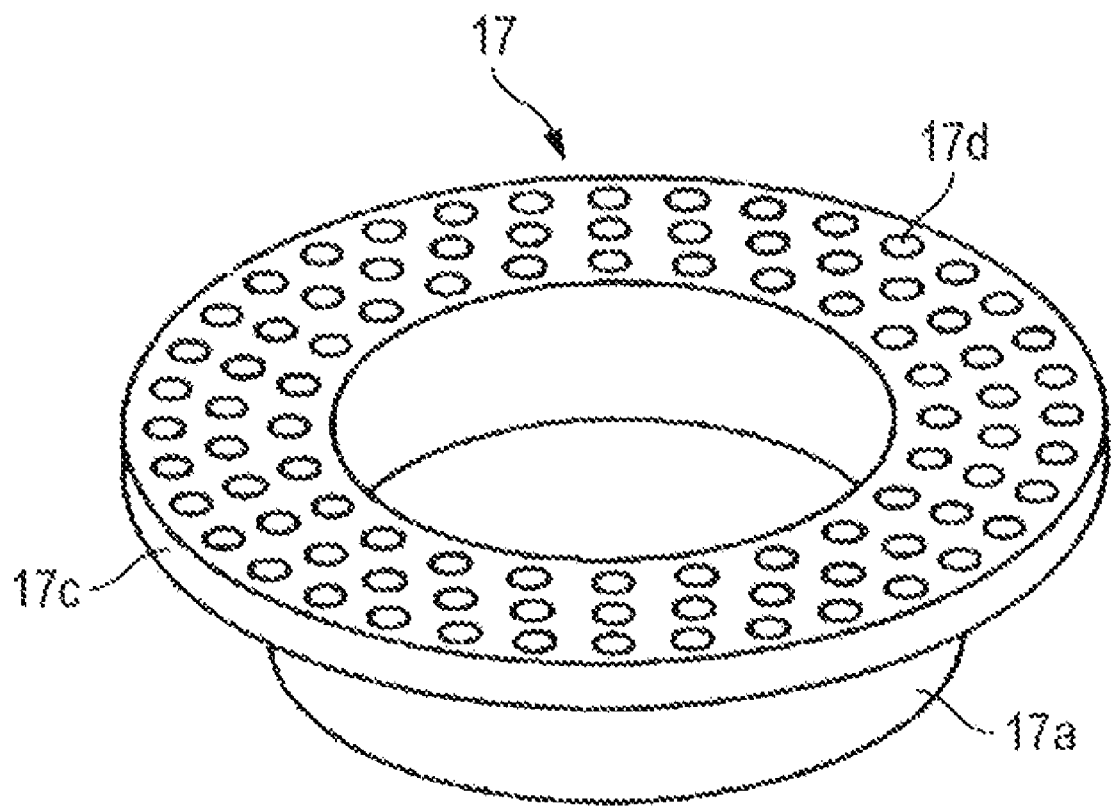
FIG. 4 is a perspective view showing a slinger after press molding.
Figure 5:
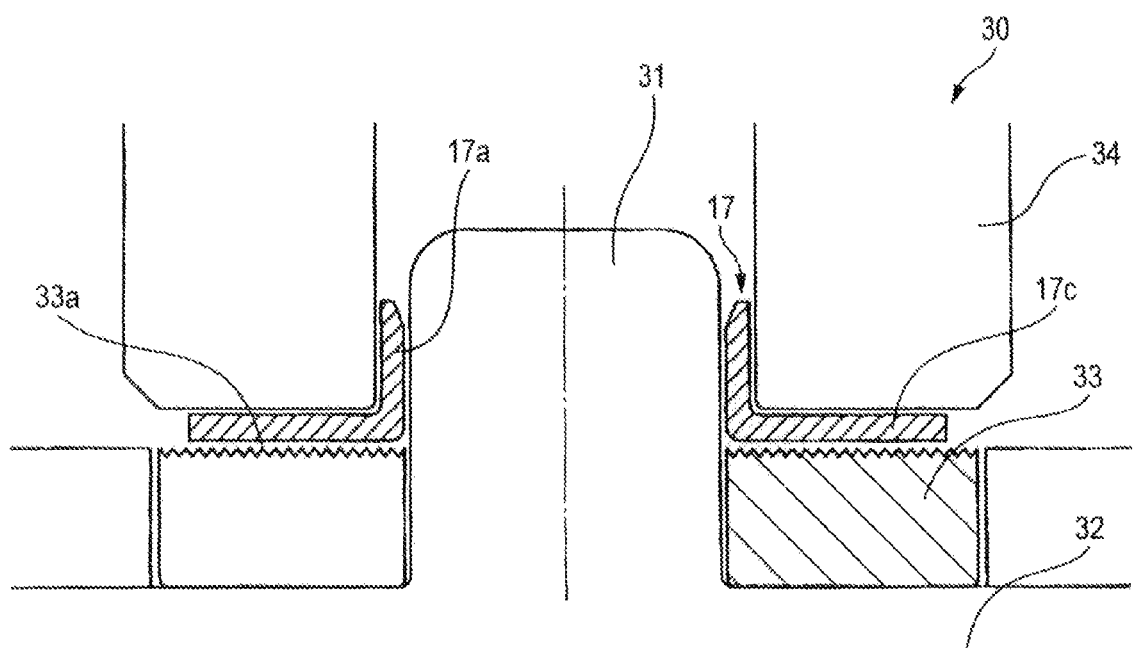
FIG. 5 is a sectional view showing a state of a slinger during press molding.

Furthermore, fine recessed and protruded portions 17d as shown in FIG. 4 are provided at the magnet-bonding face of the slinger 17. The fine recessed and protruded portions 17d present on the magnet-bonding face are formed through transcription by pressing only the magnet-bonding face to fine recesses and protrusions provided at a surface of the die when a thin plate of a magnet material is pressed between dies. Specifically, as shown in FIG. 5, a pressing machine 30 has a base 32 having a guide portion 31 in a shape of a cylindrical column having an outer diameter substantially the same as the inner diameter of a cylindrical portion 17a of the slinger 17, a face accuracy rough working die 33 in a ring-like shape outwardly fitted to the guide portion 31 above the base 32, and a press die 34 in a ring-like shape movable in an up and down direction above the rough working die 33 and having an inner diameter substantially the same as an outer diameter of the cylindrical portion 17a. Fine recesses and protrusions 33a are provided at a surface of the rough working die 33. As a method of providing the fine recesses and protrusions 33a, chemical etching, electric discharge machining, forming of rod, machining type knurling work, or the like is preferable. Moreover, as a method for forming the recesses and protrusions 33a, roughening may be carried out by shot blast processing or the like.

Further, the cylindrical portion 17a is formed between an outer peripheral face of the guide portion 31 and an inner peripheral face of the press die 34 by pressing the thin plate of the magnet material provided between the rough working die 33 and the press die 34 by driving the press die 34 downward. At this occasion, by pressing the bonding face of the thin plate forming the slinger 17 to the recesses and protrusions 33a provided at the rough working die 33, actually, relatively high protruded portions of the recesses and protrusions 33a are predominantly pressed, and recessed and projected portions 17d are formed at a portion thereof which has been flat and smooth.

A depth of the recessed portion of the recessed and protruded portion 17d is from about 1 to 20 μm, more preferably from about 2 to 10 μm. When the depth of the recessed portion is less than 1 μm, in order to exhibit an anchoring effect of the adhering agent by being brought into the recessed portion, the depth is excessively shallow and hence an increase in the bonding force is not observed so much, so that practicability is low. When the depth of the recess portion exceeds 20 μm, it is necessary to further deepen the protruded portion provided at the die 33 and hence, when the protruded portion is transcribed during pressing, there is a concern of effecting an influence also on a flat face on a back side, so that the case is not preferable.

Moreover, in the slinger 17, although a surface finished state of a flat face other than the magnet-bonding face is not particularly limited, the flat face finished by BA of BA No. 2 (Ra about 0.06), BA No. 5 (Ra about 0.03) or the like, or finished by AP of No. 23 (Ra about 0.06) or the like equal to or smaller than 0.1 μm in Ra is preferable in consideration of performance of attacking the seal lips 19a, 19b, and 19c slidingly brought into contact therewith.

An adhering agent is applied to the magnet-bonding face of the slinger 17 thus constituted and the adhering agent is brought into the recessed and protruded portions 17d, so that the bonding force between the magnet portion 21 and the slinger 17 is strengthened by the anchoring effect.

Second Embodiment

Figure 6:
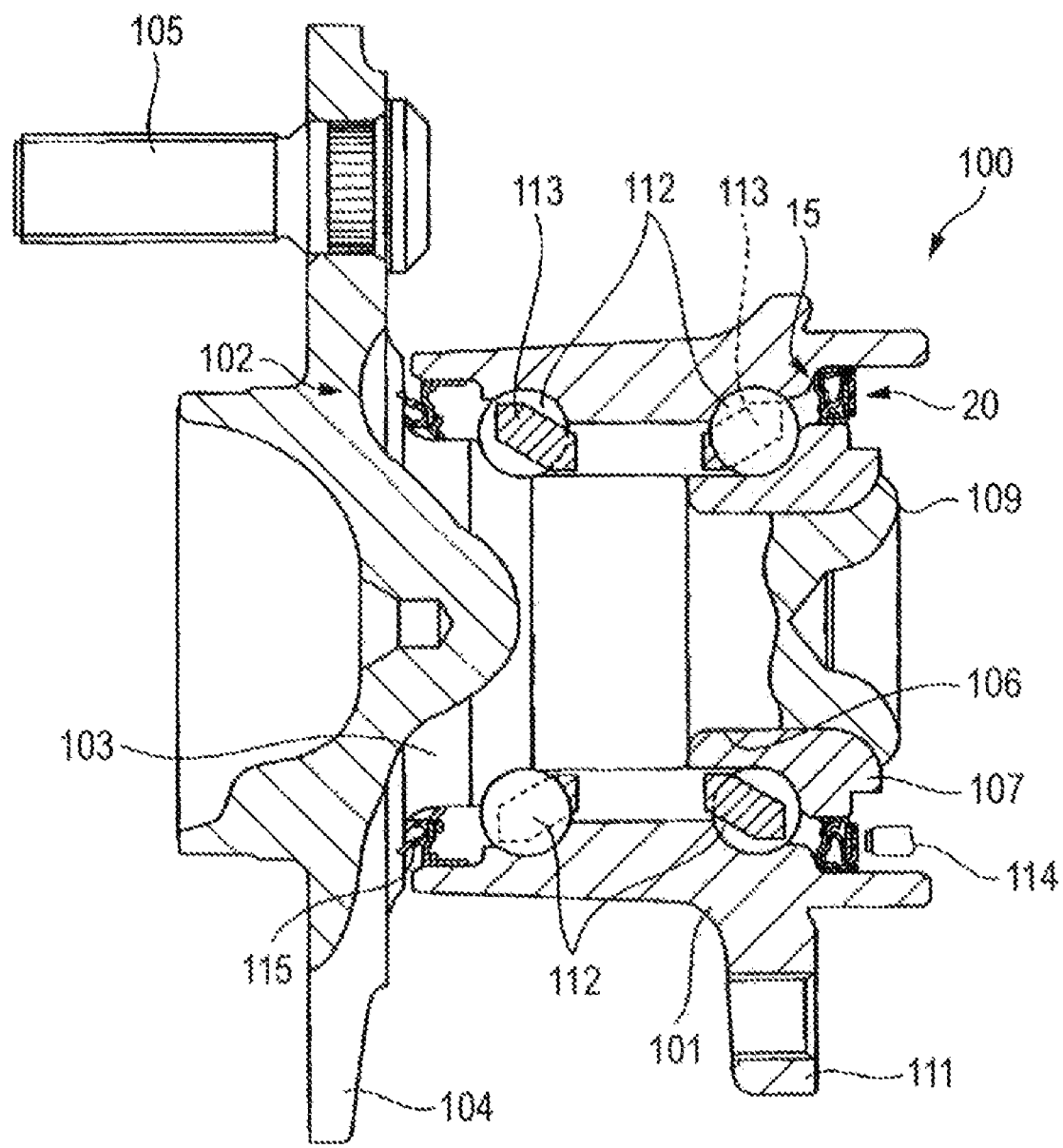
FIG. 6 is a sectional view showing another example of a roller bearing unit having a magnetic encoder.

FIG. 6 is a partial sectional view showing an application example to a wheel-supporting roller bearing unit 100 for supporting a driven wheel in an independent suspension.

The inner ring 107 of the roller bearing unit 100 is outwardly fitted to a small diameter stepped portion 106 formed at an inner end portion of the hub 103 and is coupled and fixed to the hub 103 by a caulked portion 109 formed by caulking to widen the inner end portion of the hub 103 to an outer side in a diameter direction. The hub 103 and the inner ring 107 constitute a rotation ring (rotation member). Moreover, the wheel is freely coupled and fixed to the attaching flange 104 formed at an outer end portion of the hub 103 and a portion protruded from an outer end portion of the outer ring 101 constituting a fixed ring by studs 105 implanted in a circumferential direction at predetermined intervals. In contrast thereto, the outer ring 101 is freely coupled and fixed to a knuckle or the like, not shown in the figure, constituting a suspension apparatus by the bonding flange 111 formed at an outer peripheral face thereof. A plurality of balls 112 guided by retainers 113 are rotatably arranged in a peripheral direction between the outer ring 101 and the hub 103 and the inner ring 107.

Furthermore, each sealing apparatus 15, 115 is provided respectively between inner peripheral faces of both end portions of the outer ring 101 and an outer peripheral face of a middle portion of the hub 103 and an outer peripheral face of an inner end portion of the inner ring 106. The each sealing apparatus 15, 115 blocks a space provided with the respective balls 112 from an outer space between the inner peripheral face of the outer ring 101 and the outer peripheral faces of the hub 103 and the inner ring 107. The magnetic pole-forming ring 21 is attached to the outer side face of the slinger 17 constituting the sealing apparatus 15 to constitute the magnetic encoder 20 as in the embodiment shown in FIG. 1. Further, a magnetic sensor 114 is oppositely arranged in the axial direction of the magnetic encoder 20 facing outer side thereof and the sensor detects a change in magnetic flux density to thereby detect the rotational speed of the wheel.

Third Embodiment

Figure 7:
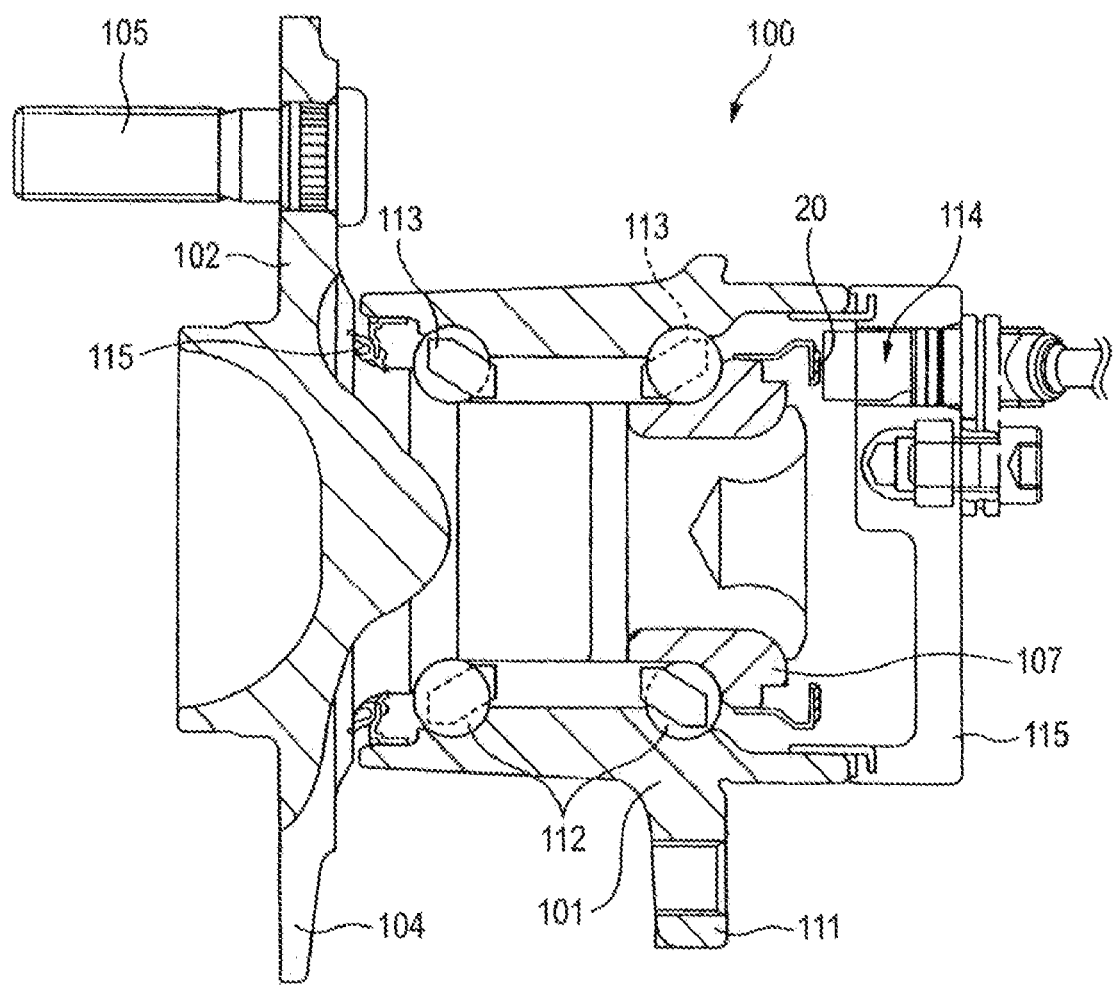
FIG. 7 is a sectional view showing still another example of a roller bearing unit having a magnetic encoder.
Figure 8:
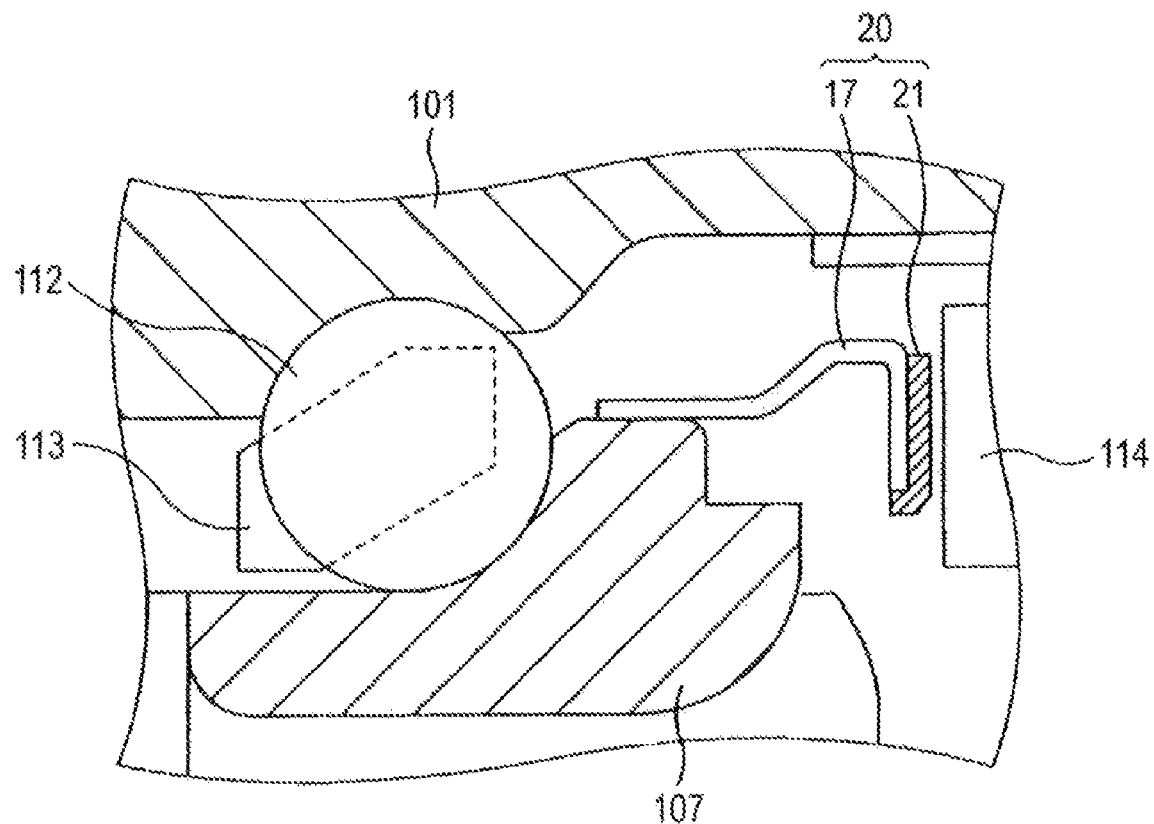
FIG. 8 is a sectional view showing a vicinity of the magnetic encoder of FIG. 7.

FIG. 7 is also a partial sectional view showing an application example to a wheel-supporting roller bearing unit 100 for supporting the driven wheel in an independent suspension and FIG. 8 is an enlarged view showing a vicinity of the magnetic encoder. In this connection, portions equivalent to the wheel-supporting roller bearing unit 100 as shown in FIG. 6 are attached with the same numerals and signs and explanation thereof will be omitted.

The wheel-supporting roller bearing unit 100 shown in the figure has a constitution that the sealing apparatus 15 is removed from the wheel-supporting roller bearing unit 100 shown in FIG. 6 and the whole is hermetically sealed by a sensor cap 115 instead. The sensor cap 115 is a resin-made cap member fitted so as to cover an opening portion surrounded with an outer ring 101 and a sensor 114 is fixed to the sensor cap 115.

Fourth Embodiment

Figure 9:
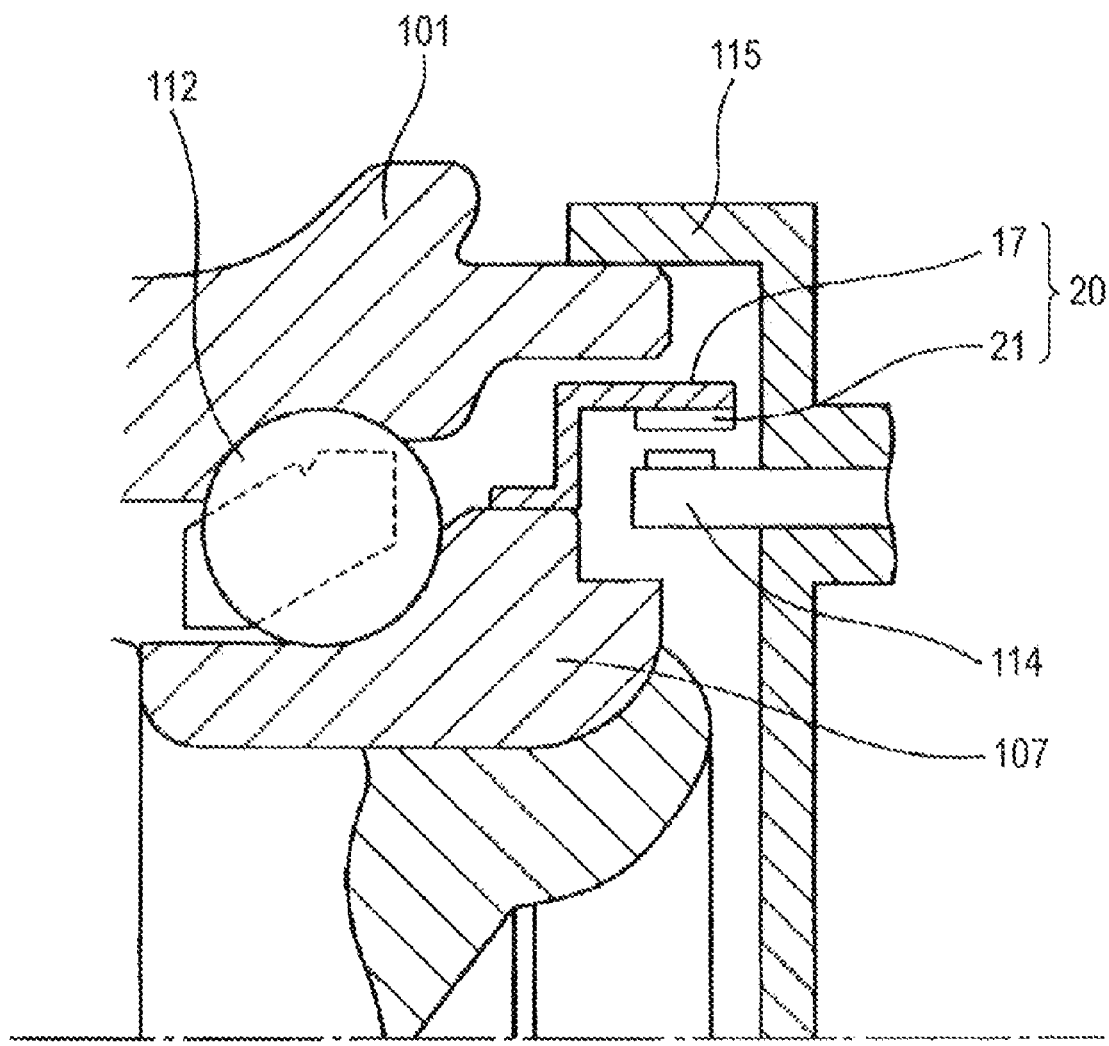
FIG. 9 is a sectional view of a substantial part showing still another example of a roller bearing unit having a magnetic encoder.

FIG. 9 has a constitution that a magnetic encoder 20 and a sensor 114 are opposed to each other in a radial direction. According to the magnetic encoder 20 of the present embodiment, a slinger 17 in a circular ring shape constituting a fixed member is outwardly fitted to be fixed to an outer peripheral portion of an inner end portion of the inner ring 107, and a magnetic pole-forming ring 21 constituting a magnet portion is attached to an inner peripheral face of the slinger 17 extended from the inner ring 107 in an axial direction. Moreover, an outer peripheral face of an outer ring 101 is fixed with a cover member 115 constituting a stationary member, and an opening portion formed at the cover member 115 is attached with the sensor 114 to be opposed to the magnetic pole-forming ring 21 in a radial direction.

According to such a constitution, in comparison with the magnetic encoder opposed thereto in an axial direction as described above, a diameter of a detected face can be increased with regard to the same space and therefore, when the pitch number stays the same, respective pitch widths can be increased and the magnetic encoder is easy to be fabricated.

Moreover, in the example shown in the figure, the magnetic encoder 20 is arranged at an axis end but can be arranged between lines (between two balls 112, 112). When arrangement between lines, materials to be used may be suitably selected in consideration of heat resistance. Furthermore, when arrangement at an axis bridge, materials to be used may be suitably selected in consideration of water resistance. In addition, in the example shown in the figure, the sensor 114 is arranged at an inner part of the magnetic encoder 20 but may be arranged at an outer part thereof.

Figure 10:
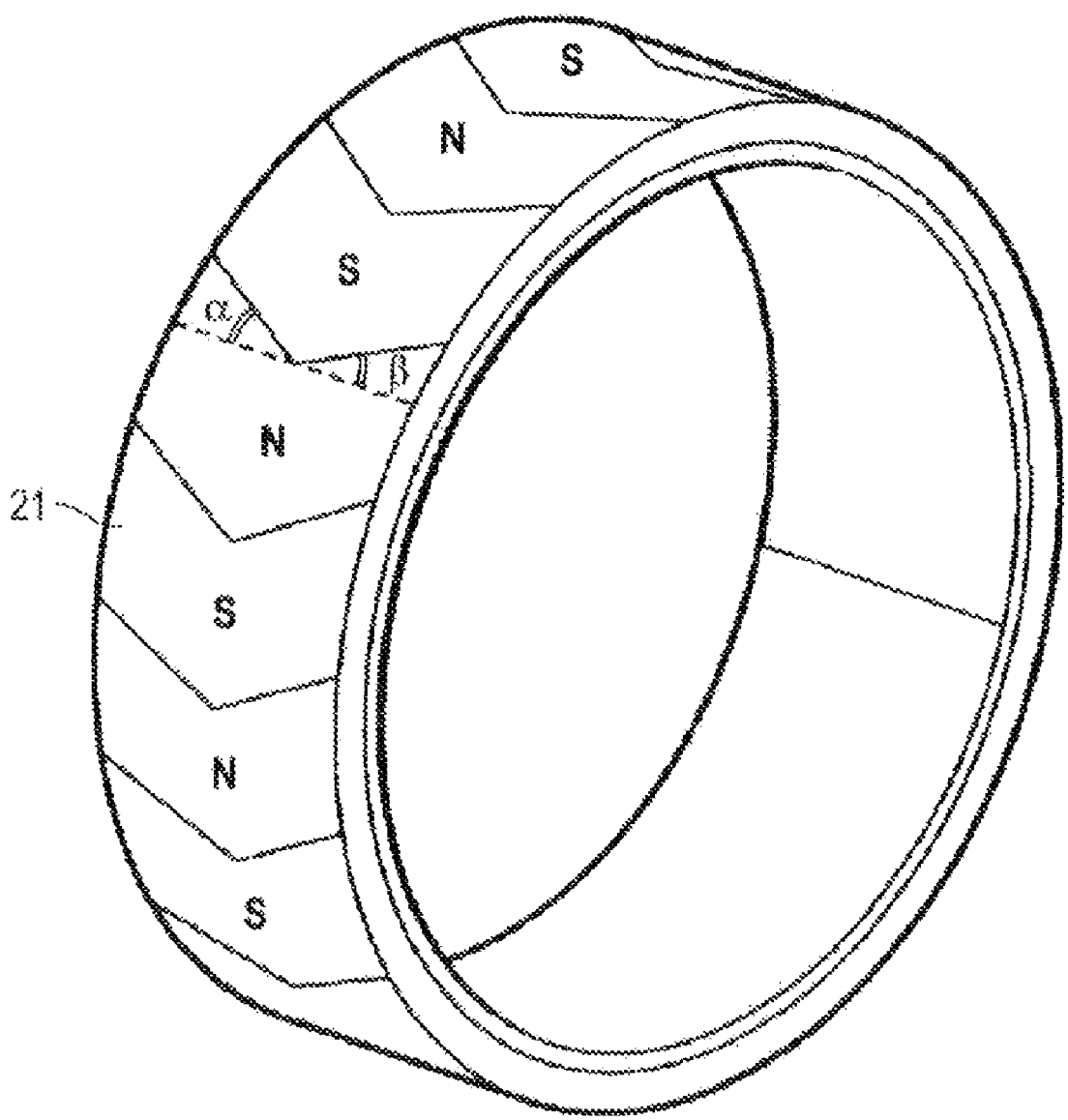
FIG. 10 is a schematic view showing another example of magnetic poles in a magnet portion.

The invention is not limited to the above-described embodiments but can be pertinently modified or improved. For example, as shown in FIG. 10, the magnetic pole-forming ring 21 can be a radial opposite type magnetized in a V-shape. In this connection, in the V-shape magnetic pole, the tilt angles to right and left ($\alpha$, $\beta$) may be not necessarily the same and the boundary of the V-shape magnetic pole is not limited to a linear line but may be a curve or a wavy line. Moreover, the magnetization method may be any of monopole magnetization where magnetization is repeated at every one pole or a plurality of poles or multipole magnetization where all magnetic poles are magnetized at once.

Figure 11:
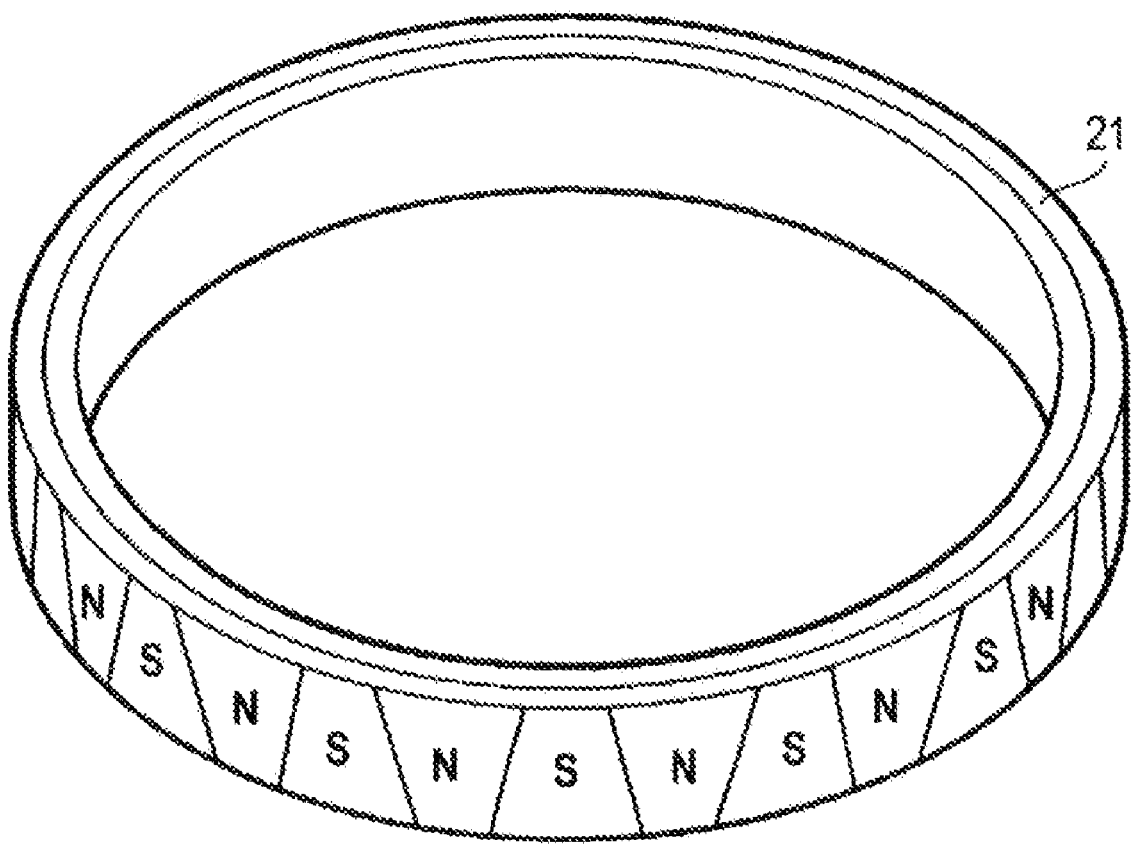
FIG. 11 is a schematic view showing still another example of magnetic poles in a magnet portion.
Figure 12:
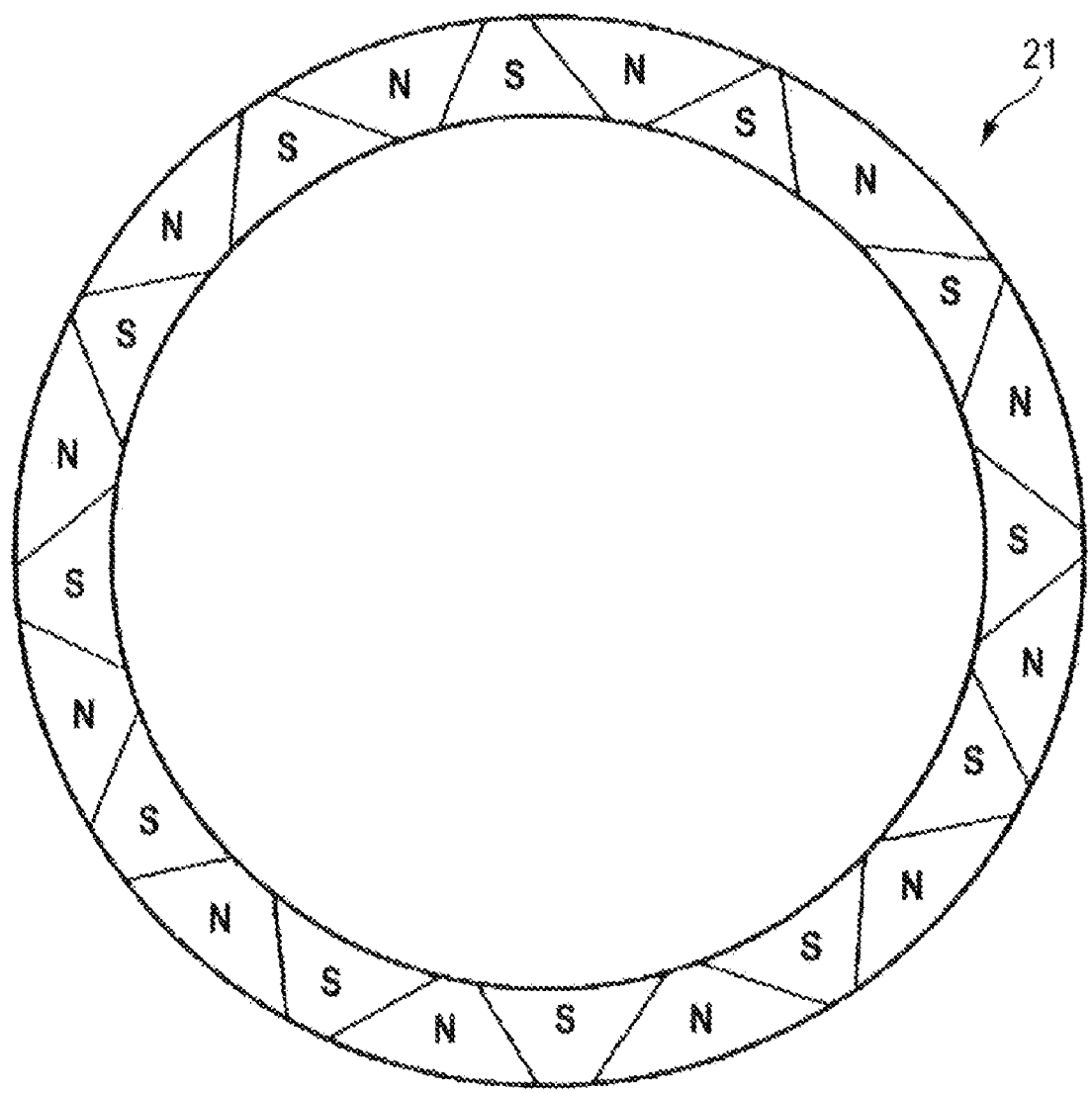
FIG. 12 is a schematic view showing the other example of magnetic poles in a magnet portion.
Figure 13:
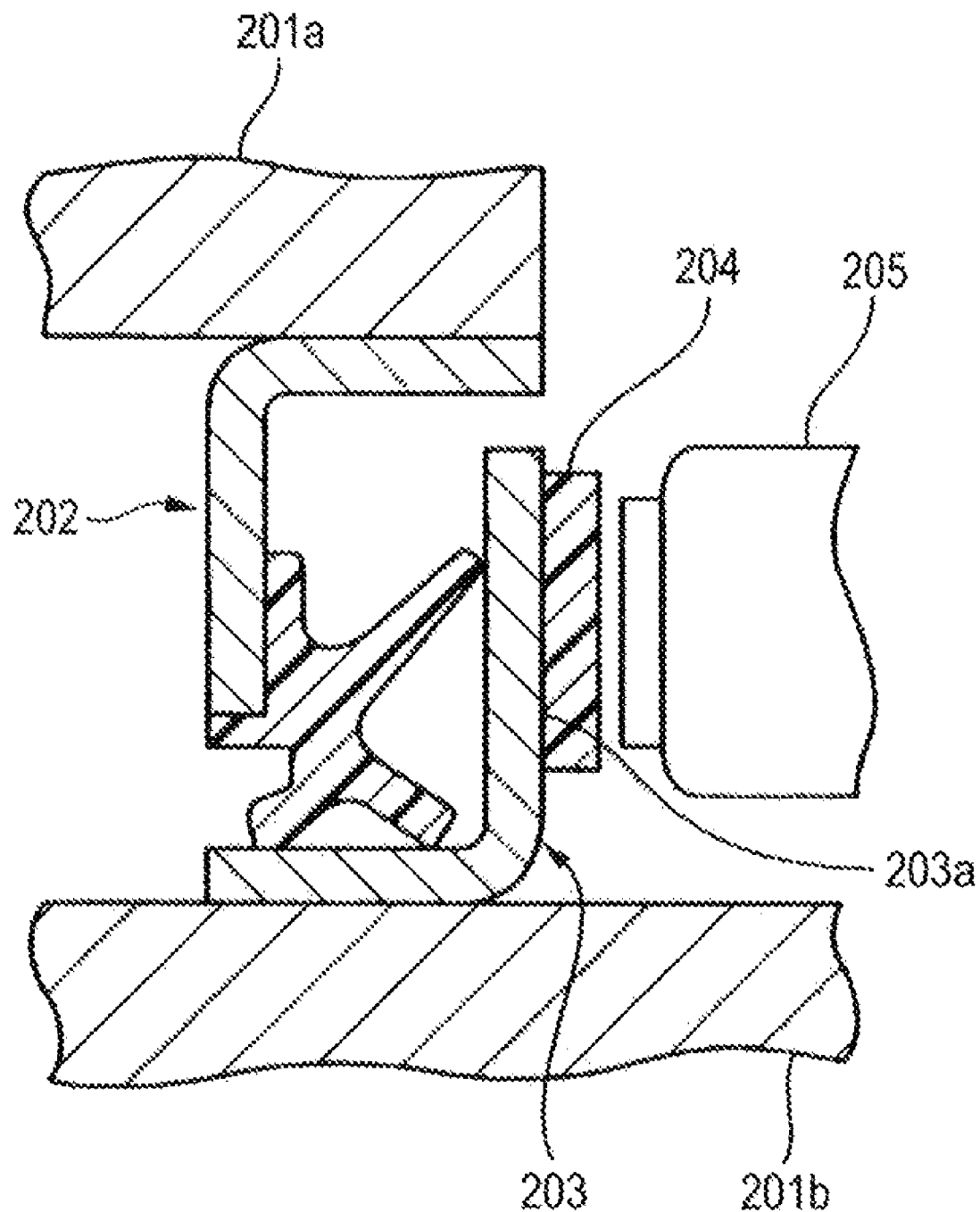
FIG. 13 is a sectional view showing a roller bearing unit having a conventional magnetic encoder.

In addition, the shape of the magnetic poles may be trapezoidal form as shown in FIG. 11. Furthermore, in the fourth embodiment, a magnet portion magnetized in a trapezoidal shape can be used as shown in FIG. 12.

EXAMPLES

The following will further define the present invention with reference to Examples and Comparative Examples. In this connection, in each test, a magnetic encoder was fabricated by the method shown below. Respective 10 pieces of the magnetic encoders fabricated were placed in a heat shock tester and subjected to heat application with repeating a cycle of 30 minutes at 120° C. and 30 minutes at −40° C. and the magnet portions were observed to check the presence of a crack at every 50 cycle.

(Test-1)

As shown in Table 3, a magnetic powder and a binder were kneaded to prepare a magnetic material, which was formed into a circular ring shape having an inner diameter of 66 mm, an outer diameter of 76 mm, and a thickness of 0.9 mm to fabricate a magnet portion. In addition, a thin plate made of ferritic stainless (SUS430) and having a thickness of 0.7 mm was formed into a circular ring shape having an inner diameter of 66 mm and an outer diameter of 76 mm and a large number of recessed portions having a depth of 10 to 20 μm were formed on the magnet-bonding face to fabricate a slinger (see, FIG. 4). Then, the magnet portion and the slinger were adhered to each other with a one solution type epoxy resin-based adhering agent (Super X2 made by Cemedine Co., Ltd.) and the whole was left for 24 hours to completely cure the adhering agent, thereby a magnetic encoder being fabricated. The results of the heat shock test are shown in Table 3.

TABLE 3

|  | Example 1 | Example 2 | Comparative Example 1 |
|---|---|---|---|
| Sr ferrite (wt %) | 90 | 0 | 90 |
| Nd—Fe—B (wt %) | 0 | 80 | 0 |
| PPS (wt %) | 7.0 | 15 | 9.7 |
| Vulcanized acrylic rubber ultrafine particles (wt %) | 2.7 | 4.7 | 0 |
| Silane coupling agent | 0.3 | 0.3 | 0.3 |
| Bending amount (ASTM D790; t = 3.2, room temperature) | 6.0 | 7.5 | 1.5 |
| BHmax [KJ/m³] (MGOe) | 15.1 (1.9) | 38.0 (4.8) | 15.1 (1.9) |
| Heat shock test result (120° C. 30 min <=> −40° C. 30 min) | no crack by 1000 cycles | no crack by 1000 cycles | crack by 50 to 100 cycles |

Sr ferrite: anisotropic Sr ferrite for magnetic field orientation, FERO TOP FM-201 (made by Toda Kogyo)

Nd—Fe—B: $Nd_2Fe_{14}B$, MQ powder (made by Magnequench, USA)

PPS: PPS neat resin powder W-220A (made by Kureha Chemical Industry Co., Ltd.)

Vulcanized acrylic rubber ultrafine particles: Narpow VP-301 (mean particle diameter of 100 to 150 nm; imported by Sanyo Trading Co., Ltd.)

Silane coupling agent: γ-aminopropyltriethoxysilane, A-1100 (made by Nippon Unicar Co., Ltd.)

As is apparent from Table 3, it is realized that use of the binder obtained by blending vulcanized rubber ultrafine particles with a polyphenylene sulfide resin results in increased bending amount of the material per se and improved crack resistance in comparison with the case of the polyphenylene sulfide resin alone, and thereby heat shock resistance is remarkably enhanced.

(Test-2)

Then, as shown in FIG. 4, a magnetic powder and a binder were kneaded to prepare a magnetic material. Moreover, a phenol resin-based adhering agent (metalock N-15 made by Toyo Kagaku Kenkyusho) including 30% of a solid component whose major component was constituted by a novolak type phenol resin was further diluted by three times with methyl ethyl ketone to prepare an adhering agent solution. In the adhering agent solution was dipped a slinger obtained by forming a thin plate made of ferritic stainless (SUS430) into a circular ring shape having an inner diameter of 66 mm and an outer diameter of 76 mm and roughening the magnet-bonding face into a rough face of Ra1.2 by shot blast. After drying at room temperature for 30 minutes, the slinger was left in a drying chamber at 120° C. for 30 minutes to thereby bake out the adhering agent in a semicured state.

Thereafter, the magnetic material was subjected to insert molding (disk gate from an inner peripheral portion) using as a core, and the slinger where the adhering agent had been baked in a semicured state. After molding, the gate was immediately cut, followed by secondary heating at 150° C. for 1 hour to completely cure the adhering agent, thereby a magnetic encoder having an inner diameter of 66 mm, an outer diameter of 76 mm, and a magnet portion thickness of 0.9 mm being obtained. The results of the heat shock test are shown in Table 4.

TABLE 4

|  | Example 3 | Example 4 | Example 5 | Example 6 | Comparative Example 2 |
|---|---|---|---|---|---|
| Sr ferrite | 89.5 | 0 | 89.5 | 0 | 90 |
| Nd—Fe—B | 0 | 80 | 0 | 80 | 0 |
| PBT | 7 | 15 | 0 | 0 | 9.7 |
| PBN | 0 | 0 | 7 | 15 | 0 |
| Modified PBT | 3 | 0 | 0 | 0 | 0 |
| Modified PBN | 0 | 0 | 3 | 0 | 0 |
| Vulcanized ACM ultrafine particles | 0 | 4.5 | 0 | 0 | 0 |
| Acid-modified EPDM | 0 | 0 | 0 | 4.5 | 0 |
| Silane coupling agent | 0.3 | 0.3 | 0.3 | 0.3 | 0.3 |
| Antioxidant | 0.2 | 0.2 | 0.2 | 0.2 | 0 |
| Bending amount (ASTM D790; t = 3.2, room temperature) | 5.2 | 7.2 | 5.5 | 6.7 | 1.3 |
| Bhmax [KJ/m$^3$] (MGOe) | 14.8 (1.9) | 38.0 (4.8) | 14.8 (1.9) | 37.9 (4.8) | 15.1 (1.9) |
| Heat shock test result (120° C. 30 min <=> −40° C. 30 min) | no crack by 1000 cycles | no crack by 1000 cycles | no crack by 1000 cycles | no crack by 1000 cycles | crack by 50 to 100 cycles |

Note
Mixing amount is an amount based on the total amount of magnetic material (wt %)
Sr ferrite: anisotropic Sr ferrite for magnetic field orientation, FERO TOP FM-201 (made by Toda Kogyo)
Nd—Fe—B: $Nd_2Fe_{14}B$, MQ powder (made by Magnequench, USA)
PBT: polybutylene terephthalate containing a heat stabilizer, Duranex 2020U (made by Polyplastics Co., Ltd.)
PBN: polybutylene naphthalate, TQB-OT (made by Teijin Chemicals Ltd.)
Vulcanized acrylic rubber ultrafine particles: Narpow VP-301 (mean particle diameter of 100 to 150 nm; imported by Sanyo Trading Co., Ltd.)
Acid-modified EPDM: maleic anhydride-modified EPDM, Royal Tough 498 (made by Shiraishi Calcium Kaisha Ltd.)
Silane coupling agent: γ-aminopropyltriethoxysilane, A-1100 (made by Nippon Unicar Co., Ltd.)
Antioxidant: N,N'-diphenyl-p-phenylenediamine, Nocrack DP (made by Ouchi Shinko Chemical Industrial Co., Ltd.)

As is apparent from Table 4, it is realized that use of the binder obtained by blending a modified polyester-based resin or rubber particles as an impact resistance-improving agent with a polyester-based resin results in increased bending amount of the material per se and improved crack resistance, and thereby heat shock resistance is remarkably enhanced.

(Test-3)
Then, as shown in Table 5, a magnetic powder and a binder were kneaded to prepare a magnetic material. Moreover, a phenol resin-based adhering agent (metalock N-15 made by Toyo Kagaku Kenkyusho) including 30% of a solid component whose major component was constituted by a novolak type phenol resin was further diluted by three times with methyl ethyl ketone to prepare an adhering agent solution. In the adhering agent solution was dipped a slinger obtained by forming a thin plate made of ferritic stainless (SUS430) and having a thickness of 0.6 mm into a circular ring shape having an inner diameter of 66 mm and an outer diameter of 76 mm and by roughening the bonding face of the magnet into a rough face of Ra1.2 by shot blast. After drying at room temperature for 30 minutes, the slinger was left in a drying chamber at 120° C. for 30 minutes to thereby bake out the adhering agent in a semicured state.

Thereafter, the magnetic material was subjected to insert molding (disk gate from an inner peripheral portion) using as a core the slinger where the adhering agent had been baked in a semicured state. After molding, the gate was immediately cut, followed by secondary heating at 150° C. for 1 hour to completely cure the adhering agent, thereby a magnetic encoder having an inner diameter of 66 mm, an outer diameter of 76 mm, and a magnet portion thickness of 0.9 mm being obtained. The results of the heat shock test are shown in Table 5.

TABLE 5

|  | Example 7 | Example 8 | Example 9 | Example 10 | Comparative Example 3 |
|---|---|---|---|---|---|
| Sr ferrite | 89.5 | 0 | 89.5 | 0 | 90 |
| Nd—Fe—B | 0 | 80 | 0 | 80 | 0 |
| PA6 | 7.0 | 0 | 7.0 | 0 | 9.7 |
| PA66 | 0 | 15 | 0 | 0 | 0 |
| PA46 | 0 | 0 | 0 | 10 | 0 |
| PA612 | 0 | 5 | 0 | 0 | 0 |
| Modified PA6T | 0 | 0 | 0 | 5 | 0 |
| Modified PA6 | 3.0 | 0 | 0 | 0 | 0 |

TABLE 5-continued

|  | Example 7 | Example 8 | Example 9 | Example 10 | Comparative Example 3 |
|---|---|---|---|---|---|
| Vulcanized X-NBR ultrafine particles | 0 | 4.5 | 0 | 0 | 0 |
| Vulcanized ACM ultrafine particles | 0 | 0 | 0 | 4.5 | 0 |
| Acid-Modified EPDM | 0 | 0 | 3.0 | 0 | 0 |
| Silane coupling agent | 0.3 | 0.3 | 0.3 | 0.3 | 0.3 |
| Antioxidant | 0.2 | 0.2 | 0.2 | 0.2 | 0 |
| Bending amount (ASTM D790; t = 3.2, room temperature) | 5.8 | 8.2 | 6.5 | 7.8 | 1.5 |
| BHmax [KJ/m$^3$] (MGOe) | 14.8 (1.9) | 38.0 (4.8) | 14.8 (1.9) | 37.9 (4.8) | 15.1 (1.9) |
| Heat shock test result (120° C. 30 min <=> −40° C. 30 min) | no crack by 1000 cycles | no crack by 1000 cycles | no crack by 1000 cycles | no crack by 1000 cycles | crack by 50 to 100 cycles |

Note
Mixing amount is an amount based on the total amount of magnetic material (wt %)
Sr ferrite: anisotropic Sr ferrite for magnetic field orientation, FERO TOP FM-201 (made by Toda Kogyo)
Nd—Fe—B: $Nd_2Fe_{14}B$, MQ powder (made by Magnequench, USA)
PA6: UBE nylon P1013 (powdery product, made by Ube Industries, Ltd.)
PA66: UBE nylon P2020 (powdery product, made by Ube Industries, Ltd.)
PA46: Stanyl TW341 (containing an amine-based antioxidant, made by DJEP)
PA612: Zaitel 153HSL (containing a hindered phenol-based antioxidant, made by DuPont)
Modified PA6T: PA6T/66, Ahrene AE4200 (made by Mitsui Chemicals Inc.)
Modified PA6: PA6 having a soft segment, glyron EXL ELX50HNZ (made by Ems Showa Denko, KK)
Vulcanized X-NBR ultrafine particles: vulcanized carboxylic acid-modified NBR, Narpow VP-301 (mean particle diameter of 50 to 100 nm; imported by Sanyo Trading Co., Ltd.)
Vulcanized acrylic rubber ultrafine particles: Narpow VP-301 (mean particle diameter of 100 to 150 nm; imported by Sanyo Trading Co., Ltd.)
Acid-modified EPDM: maleic anhydride-modified EPDM, Royal Tough 498 (made by Shiraishi Calcium Kaisha Ltd.)
Silane coupling agent: γ-aminopropyltriethoxysilane, A-1100 (made by Nippon Unicar Co., Ltd.)
Antioxidant: N,N'-diphenyl-p-phenylenediamine, Nocrack DP (made by Ouchi Shinko Chemical Industrial Co., Ltd.)

As is apparent from Table 5, it is realized that use of the binder obtained by blending a modified polyamide resin or rubber particles as an impact resistance-improving agent with a polyamide resin results in increased bending amount of the material per se and improved crack resistance, and thereby heat shock resistance is remarkably enhanced.

(Test-4)

Then, as shown in FIG. 6, a magnetic powder and a binder were kneaded to prepare a magnetic material. Moreover, a phenol resin-based adhering agent (metalock N-15 made by Toyo Kagaku Kenkyusho) including 30% of a solid component whose major component was constituted by a novolak type phenol resin was further diluted by three times with methyl ethyl ketone to prepare an adhering agent solution. In the adhering agent solution was dipped a slinger (see, FIG. 4) obtained by forming a thin plate made of ferritic stainless (SUS430) and having a thickness of 0.6 mm into a circular ring shape having an inner diameter of 66 mm and an outer diameter of 76 mm and by further subjecting the plate to pressing to form a large number of recessed portions having a depth of 10 to 20 μm at the bonding face of the magnet. After drying at room temperature for 30 minutes, the slinger was left in a drying chamber at 120° C. for 30 minutes to thereby bake out the adhering agent in a semicured state.

Thereafter, the magnetic material was subjected to insert molding (disk gate from an inner peripheral portion) using as a core the slinger where the adhering agent had been baked in a semicured state. After molding, the gate was immediately cut, followed by secondary heating at 150° C. for 1 hour to completely cure the adhering agent, thereby a magnetic encoder having an inner diameter of 66 mm, an outer diameter of 76 mm, and a magnet portion thickness of 0.9 mm being obtained. The results of the heat shock test are shown in Table 6.

TABLE 6

|  | Example 11 | Example 12 | Example 13 | Example 14 | Comparative Example 4 |
|---|---|---|---|---|---|
| Sr ferrite | 89.5 | 0 | 89.5 | 0 | 90 |
| Nd—Fe—B | 0 | 80 | 0 | 80 | 0 |

TABLE 6-continued

|  | Example 11 | Example 12 | Example 13 | Example 14 | Comparative Example 4 |
|---|---|---|---|---|---|
| PA12 | 7.0 | 0 | 0 | 0 | 9.7 |
| PA612 | 0 | 15 | 0 | 0 | 0 |
| PAMXD6 | 0 | 0 | 7.0 | 0 | 0 |
| Modified PA6T | 0 | 0 | 0 | 15 | 0 |
| Modified PA12 | 3.0 | 0 | 0 | 0 | 0 |
| Vulcanized X-NBR ultrafine particles | 0 | 0 | 3.0 | 0 | 0 |
| Vulcanized ACM ultrafine particles | 0 | 4.5 | 0 | 4.5 | 0 |
| Silane coupling agent | 0.3 | 0.3 | 0.3 | 0.3 | 0.3 |
| Antioxidant | 0.2 | 0.2 | 0.2 | 0.2 | 0 |
| Bending amount (ASTM D790; t = 3.2, room temperature) | 6.0 | 8.0 | 5.5 | 7.5 | 1.5 |
| BHmax [KJ/m$^3$] (MGOe) | 14.8 (1.9) | 38.0 (4.8) | 14.8 (1.9) | 37.9 (4.8) | 15.1 (1.9) |
| Heat shock test result (120° C. 30 min <=> −40° C. 30 min) | no crack by 1000 cycles | no crack by 1000 cycles | no crack by 1000 cycles | no crack by 1000 cycles | crack by 50 to 100 cycles |

Note
Mixing amount is an amount based on the total amount of magnetic material (wt %)
Sr ferrite: anisotropic Sr ferrite for magnetic field orientation, FERO TOP FM-201 (made by Toda Kogyo)
Nd—Fe—B: Nd$_2$Fe$_{14}$B, MQ powder (made by Magnequench, USA)
PA12: PA12 powder P3012U (containing a hindered phenol-based antioxidant, made by Ube Industries, Ltd.)
PA612: Zaitel 153HSL (containing a hindered phenol-based antioxidant, made by DuPont)
PAMXD6: Reny NX5001 (made by Mitsubishi Engineering-Plastics Corporation)
Modified PA6T: PA6T/66, Arrene AE4200 (made by Mitsui Chemicals Inc.)
Modified PA12: UBEPAE 1210U (containing a hindered phenol-based antioxidant, made by Ube Industries, Ltd.)
Vulcanized X-NBR ultrafine particles: vulcanized carboxylic acid-modified NBR, Narpow VP-301 (mean particle diameter of 50 to 100 nm; imported by Sanyo Trading Co., Ltd.)
Vulcanized acrylic rubber ultrafine particles: Narpow VP-301 (mean particle diameter of 100 to 150 nm; imported by Sanyo Trading Co., Ltd.)
Silane coupling agent: γ-aminopropyltriethoxysilane, A-1100 (made by Nippon Unicar Co., Ltd.)
Antioxidant: N,N'-diphenyl-p-phenylenediamine, Nocrack DP (made by Ouchi Shinko Chemical Industrial Co., Ltd.)

As is apparent from Table 6, it is realized that use of the binder obtained by blending a modified polyamide resin or rubber particles as an impact resistance-improving agent with a polyamide resin results in increased bending amount of the material per se and improved crack resistance, and thereby heat shock resistance is remarkably enhanced.

(Test-5)

As shown in FIG. 7, a magnetic powder and a binder were kneaded to prepare a magnetic material. Moreover, a phenol resin-based adhering agent (metalock N-15 made by Toyo Kagaku Kenkyusho) including 30% of a solid component whose major component was constituted by a novolak type phenol resin was further diluted by three times with methyl ethyl ketone to prepare an adhering agent solution. In the adhering agent solution was dipped a slinger obtained by forming a thin plate made of ferritic stainless (SUS430) and having a thickness of 0.6 mm into a circular ring shape having an inner diameter of 66 mm and an outer diameter of 76 mm and by further roughening the bonding face of the magnet into a rough face of Ra0.8 (seal sliding face side being material roughness of Ra0.08) by shot blast. After drying at room temperature for 30 minutes, the slinger was left in a drying chamber at 120° C. for 30 minutes to thereby bake out the adhering agent in a semicured state.

Thereafter, the magnetic material was subjected to insert molding (disk gate from an inner peripheral portion) using as a core the slinger where the adhering agent had been baked in a semicured state. After molding, the gate was immediately cut, followed by secondary heating at 150° C. for 1 hour to completely cure the adhering agent, thereby a magnetic encoder having an inner diameter of 66 mm, an outer diameter of 76 mm, and a magnet portion thickness of 0.9 mm being obtained. The results of the heat shock test are shown in Table 7.

TABLE 7

|  | Example 15 | Example 16 | Example 17 | Example 18 | Comparative Example 5 | Referential Example 1 | Referential Example 2 |
|---|---|---|---|---|---|---|---|
| Sr ferrite | 89.5 | 0 | 89.5 | 0 | 90 | 89.5 | 89.5 |
| Nd—Fe—B | 0 | 80 | 0 | 80 | 0 | 0 | 0 |
| PA12 | 7 | 0 | 0 | 0 | 9.7 | 7.1 | 7 |
| PA612 | 0 | 15 | 0 | 0 | 0 | 0 | 0 |
| PAMXD6 | 0 | 0 | 7 | 0 | 0 | 0 | 0 |

TABLE 7-continued

|  | Example 15 | Example 16 | Example 17 | Example 18 | Comparative Example 5 | Referential Example 1 | Referential Example 2 |
|---|---|---|---|---|---|---|---|
| Modified PA6T | 0 | 0 | 0 | 15 | 0 | 0 | 0 |
| Modified PA12 | 3 | 0 | 0 | 0 | 0 | 3.1 | 3 |
| Vulcanized X-NBR ultrafine particles | 0 | 0 | 3 | 0 | 0 | 0 | 0 |
| Vulcanized ACM ultrafine particles | 0 | 4.5 | 0 | 4.5 | 0 | 0 | 0 |
| Silane coupling agent | 0.3 | 0.3 | 0.3 | 0.3 | 0.3 | 0.3 | 0.3 |
| Amine-based antioxidant | 0.2 | 0.2 | 0.2 | 0.2 | 0 | 0 | 0 |
| Phenol-based antioxidant | 0 | 0 | 0 | 0 | 0 | 0 | 0.2 |
| Bending amount (ASTM D790; t = 3.2, room temperature) | 6.0 | 8.0 | 5.5 | 7.5 | 1.5 | 6.1 | 6.0 |
| BHmax [KJ/m$^3$] (MGOe) | 14.8 (1.9) | 38.0 (4.8) | 14.8 (1.9) | 37.9 (4.8) | 15.1 (1.9) | 14.8 (1.9) | 14.8 (1.9) |
| Heat shock test result (120° C. 30 min <=> −40° C. 30 min) | no crack by 1000 cycles | no crack by 1000 cycles | no crack by 1000 cycles | no crack by 1000 cycles | crack by 50 to 100 cycles | crack by 200 to 300 cycles | crack by 600 to 800 cycles |

Note
Mixing amount is an amount based on the total amount of magnetic material (wt %)
Sr ferrite: anisotropic Sr ferrite for magnetic field orientation, FERO TOP FM-201 (made by Toda Kogyo)
Nd—Fe—B: Nd$_2$Fe$_{14}$B, MQ powder (made by Magnequench, USA)
PA12: P3012U (powder product, containing a hindered phenol-based antioxidant, made by Ube Industries, Ltd.)
PA612: Zaitel 153HSL (containing a hindered phenol-based antioxidant, made by DuPont)
PAMXD6: Reny NX5001 (made by Mitsubishi Engineering-Plastics Corporation)
Modified PA6T: PA6T/66, Arrene AE4200 (made by Mitsui Chemicals Inc.)
Modified PA12: UBEPAE 1210U (containing a hindered phenol-based antioxidant, made by Ube Industries, Ltd.)
Vulcanized X-NBR ultrafine particles: vulcanized carboxylic acid-modified NBR, Narpow VP-301 (mean particle diameter of 50 to 100 nm; imported by Sanyo Trading Co., Ltd.)
Vulcanized ACM rubber ultra fine particles: vulcanized acylic rubber, Narpow VP-301 (mean particle diameter of 100 to 150 nm; imported by Sanyo Trading Co., Ltd.)
Silane coupling agent: γ-aminopropyltriethoxysilane, A-1100 (made by Nippon Unicar Co., Ltd.)
Amine-based antioxidant: N,N'-diphenyl-p-phenylenediamine, Nocrack DP (made by Ouchi Shinko Chemical Industrial Co., Ltd.)
Phenol-based antioxidant: triethylene glycol-bis[3-(3-t-butyl-5-methyl-4-hydroxyphenyl)propionate], IRGANOX245 (made by Chiba Specialty Chemicals)

As is apparent from Table 7, it is realized that, as the cases of Examples, use of the binder obtained by blending an impact resistance-improving-agent (a modified polyamide resin or rubber particles) and an amine-based antioxidant with a low water-absorbing polyamide resin results in increased bending amount of the material per se and improved crack resistance, and thereby heat shock resistance is remarkably enhanced.

Particularly, in Examples 15 to 18, even when low water-absorbing polyamide resins are used, heat shock resistance is improved to a large extent as compared with Comparative Example 5 wherein no impact resistance-improving agent is blended or Referential Example 1 wherein no amine-based antioxidant is blended or Referential Example 2 wherein an antioxidant (a phenol-based antioxidant) other than an amine-based antioxidant is blended.

The present application is based on Japanese Patent Application No. 2005-137307 filed on May 10, 2005, Japanese Patent Application No. 2005-151395 filed on May 24, 2005, Japanese Patent Application No. 2005-180669 filed on Jun. 21, 2005, and the contents are incorporated herein by reference.

The invention claimed is:

1. A magnetic encoder comprising:
a magnet portion formed by circularly arranging a magnetic material comprising a magnetic powder and a binder for the magnetic powder, wherein
the binder comprises at least a thermoplastic resin and an impact resistance-improving agent, and
a bending deflection amount of the magnetic portion falls within a range of 2 to 15 mm in an experimental condition that a thickness of magnetic material is 3.0 mm, span distance is 50 mm and temperature is 23° C. under ASTM D790.

2. The magnetic encoder according to claim 1, wherein the thermoplastic resin is a polyamide resin, and
the impact resistance-improving agent is at least one of vulcanized rubber particles and a modified polyamide resin.

3. The magnetic encoder according to claim 1, wherein the thermoplastic resin is a polyester-based resin, and
the impact resistance-improving agent is at least one of vulcanized rubber particles and a modified polyester resin.

4. The magnetic encoder according to claim 1, wherein the thermoplastic resin is a polyphenylene sulfide resin, and
the impact resistance-improving agent is vulcanized rubber particles.

5. The magnetic encoder according to claim 2, wherein the thermoplastic resin is selected from the group consisting of polyamide 12, polyamide 11, polyamide 612, polyamide 610, modified polyamide 6T, polyamide 9T and polyimide MXD6.

6. The magnetic encoder according to claim 1, wherein the thermoplastic resin is a polyamide resin, and
the binder further comprises an aromatic amine-based antioxidant.

7. A roller bearing unit comprising:
a fixed ring;
a rotating ring;

a plurality of rolling elements rotatably arranged in a circumferential direction between ring and rotating ring; and the magnetic encoder according to claim 1, wherein the magnet portion is fixed to a slinger composed of a magnetic material with an adhering agent, and the slinger is fixed to the rotating ring.

8. The magnetic encoder according to claim 1, wherein, the thermoplastic resin is a polyamide 12 resin, and the impact resistance-improving agent is a modified polyamide 12 resin which is a block copolymer comprising:

a hard segment of the polyamide 12; and a soft segment of at least one of a polyester component and a polyether component.

9. The magnetic encoder according to claim 1, wherein the thermoplastic resin is a polybutylene terephthalate, and the impact resistance-improving agent is a modified polybutylene terephthalate which is a block copolymer comprising:

a hard segment of the polybutylene terephthalate; and a soft segment of at least one of the polyester component and the polyether component.

10. The magnetic encoder according to claim 1, wherein the thermoplastic resin is a polybutylene naphthalate, and the impact resistance-improving agent is a modified polybutylene naphthalate which is a block copolymer comprising:

a hard segment of the polybutylene naphthalate; and a soft segment of at least one of the polyester component and the polyether component.

11. The binder of the magnetic encoder according to claim 2, further comprising;

antioxidant selected from diphenylamine-based compounds and p-phenylenediamine-based compounds.

12. The binder of the magnetic encoder according to claim 5, further comprising;

antioxidant selected from diphenylamine-based compounds and p-phenylenediamine-based compounds.

13. The binder of the magnetic encoder according to claim 8, further comprising;

antioxidant selected from diphenylamine-based compounds and p-phenylenediamine-based compounds.

14. The binder of the magnetic encoder according to claim 2, wherein a diameter of the vulcanized rubber particles falls within a range of 30 to 300 nm, and the vulcanized rubber particles are selected from the group consisting of acrylic rubber, carboxyl-modified acrylonitrile-butadiene rubber and carboxyl-modified hydrogenated nitrile rubber.

15. The binder of the magnetic encoder according to claim 8, wherein a diameter of the vulcanized rubber particles falls within the range of 30 to 300 nm, and the vulcanized rubber particles are selected from the group consisting of acrylic rubber, carboxyl-modified acrylonitrile-butadiene rubber and carboxyl-modified hydrogenated nitrite rubber.

16. The binder of the magnetic encoder according to claim 4, wherein a diameter of the vulcanized rubber particles falls within the range of 30 to 300 nm, and the vulcanized rubber particles are selected from the group consisting of carboxyl-modified acrylonitrile-butadiene rubber and carboxyl-modified hydrogenated nitrite rubber.

17. The magnetic encoder according to claim 1, wherein the magnet portion and a slinger are bonded by at least one of a phenolic resin based adhering agent and an epoxy resin based adhering agent.

18. The magnetic encoder according to claim 8, wherein the magnet portion and a slinger are bonded by at least one of a phenolic resin based adhering agent and an epoxy resin based adhering agent.

19. The magnetic encoder according to claim 17, wherein the magnet portion and the slinger are bonded by insert molding.

20. The magnetic encoder according to claim 18, wherein the magnet portion and the slinger are bonded by insert molding.

* * * * *